US010296105B2

(12) United States Patent
Fujimaki et al.

(10) Patent No.: US 10,296,105 B2
(45) Date of Patent: May 21, 2019

(54) HEAD-MOUNTED DISPLAY DEVICE, COMPUTER PROGRAM, AND CONTROL METHOD FOR HEAD-MOUNTED DISPLAY DEVICE

(71) Applicant: SEIKO EPSON CORPORATION, Tokyo (JP)

(72) Inventors: Yutaka Fujimaki, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/801,916

(22) Filed: Nov. 2, 2017

(65) Prior Publication Data
US 2018/0150147 A1 May 31, 2018

(30) Foreign Application Priority Data

Nov. 30, 2016 (JP) .................................. 2016-232379
Jun. 5, 2017 (JP) .................................. 2017-111052

(51) Int. Cl.
*G06F 3/0346* (2013.01)
*G06F 3/01* (2006.01)
*G06F 3/042* (2006.01)
*G06F 3/038* (2013.01)

(52) U.S. Cl.
CPC ............ *G06F 3/0346* (2013.01); *G06F 3/017* (2013.01); *G06F 3/038* (2013.01); *G06F 3/0425* (2013.01); *G06F 2203/0384* (2013.01)

(58) Field of Classification Search
None
See application file for complete search history.

(56) References Cited

U.S. PATENT DOCUMENTS

2015/0277573 A1* 10/2015 Kang ................. G06K 9/00355
   345/156
2016/0109957 A1*  4/2016 Takashima .............. G06F 1/163
   345/8
2017/0282062 A1* 10/2017 Black ...................... A63F 13/25

FOREIGN PATENT DOCUMENTS

JP         2012-252581 A     12/2012

* cited by examiner

*Primary Examiner* — Duane N Taylor, Jr.
(74) *Attorney, Agent, or Firm* — Oliff PLC

(57) ABSTRACT

An HMD includes an image display section configured to display an image in a display region to be transmitted through an outside scene and recognizable together with the outside scene, a camera and an imaging control section configured to detect a pointer associated with a motion of the user in a region including at least a range in which the image is transmitted through the image display section, and a display control section configured to cause the image display section to display, in the display region, an image indicating a detection state of the pointer by the camera and the imaging control section and cause the display section to display a candidate of input content corresponding to at least any one of a movement, a shape, and a position of the pointer detected by the camera and the imaging control section.

27 Claims, 18 Drawing Sheets

HEAD-MOUNTED DISPLAY DEVICE, COMPUTER PROGRAM, AND CONTROL METHOD FOR HEAD-MOUNTED DISPLAY DEVICE

BACKGROUND

1. Technical Field

The present invention relates to a head-mounted display device, a computer program, and a control method for the head-mounted display device.

2. Related Art

There has been known a device that detects a movement or the like of a pointer and executes processing corresponding to the detected movement or the like of the pointer (see, for example, JP-A-2012-252581 (Patent Literature 1).

Patent Literature 1 discloses a sign language recognition device that images a finger character of a sign language signer, processes picked-up image data picked up by the imaging, and recognizes the finger character of the sign language signer.

In a head-mounted display device that is mounted on the head of a user and causes the user to visually recognize an image over an outside scene, visibility of the outside scene is deteriorated depending on a displayed image. Therefore, it is sometimes difficult to operate an operation section of the head-mounted display device. For this reason, there has been a demand for an input method having high accuracy of an input and convenient for use.

SUMMARY

An advantage of some aspects of the invention is to improve accuracy of an input by a pointer and improve convenience for a user.

An aspect of the invention is directed to a head-mounted display device mounted on a head of a user, the head-mounted display device including: a display section configured to display an image in a display region to be transmitted through an outside scene and recognizable together with the outside scene; a detecting section configured to detect a pointer associated with a motion of the user in a region including at least a range in which the image is transmitted through the display section; and a display control section configured to cause the display section to display, in the display region, an image indicating a detection state in which the detecting section detects the pointer and cause the display section to display a candidate of input content corresponding to at least any one of a movement, a shape, and a position of the pointer detected by the detecting section.

According to the aspect of the invention, the image indicating the detection state of the pointer by the detecting section is displayed in the display region. For this reason, it is easy to confirm the detection state of the pointer by the detecting section. The candidate of the input content corresponding to any one of the movement, the shape, and the position of the pointer detected by the detecting section is displayed in a position corresponding to an image indicating a detection area. For this reason, it is possible to improve input accuracy by the pointer and improve convenience for the user.

In the head-mounted display device according to the aspect of the invention, the display control section may cause the display section to display the image indicating the detection state of the detecting section to be associated with a position where the pointer is visually recognized in the outside scene.

According to the aspect of the invention with this configuration, since the image indicating the detection state of the detecting section is displayed to be associated with the position where the pointer is visually recognized, the user can confirm the detection state while operating the pointer.

In the head-mounted display device according to the aspect of the invention, the display control section may cause the display section to display, in a position corresponding to the image indicating the detection state of the detecting section, the candidate corresponding to at least any one of the movement, the shape, and the position of the pointer detected by the detecting section.

According to the aspect of the invention with this configuration, since the candidate corresponding to at least any one of the movement, the shape, and the position of the pointer detected by the detecting section is displayed in the position corresponding to the image indicating the detection state of the detecting section, the user can confirm the detection state of the detecting section while operating the pointer.

In the head-mounted display device according to the aspect of the invention, the display control section may cause the display section to display, in the display region, as the image indicating the detection state of the detecting section, an image indicating a detection area where the detecting section detects the pointer and cause the display section to display, in a position corresponding to the image indicating the detection area in the display region, the candidate corresponding to at least any one of the movement, the shape, and the position of the pointer detected by the detecting section.

According to the aspect of the invention with this configuration, since the image indicating the detection area where the detecting section detects the pointer is displayed as the image indicating the detection state of the detecting section, it is easy to confirm the detection area where the pointer is detected. It is possible to improve operability. Since the candidate corresponding to at least any one of the movement, the shape, and the position of the pointer detected by the detecting section is displayed in the position corresponding to the image indicating the detection area, the user can confirm the detection state of the detecting section while operating the pointer.

In the head-mounted display device according to the aspect of the invention, the display control section may cause the display section to display the candidate in a candidate display area of the display region and cause the display section to display the candidate display area in a position corresponding to the image indicating the detection area or a position corresponding to the pointer detected in the detection area.

According to the aspect of the invention with this configuration, an image indicating the candidate display area is displayed in the position corresponding to the image indicating the detection area or the position corresponding to the pointer detected in the detection area. Therefore, it is easy to perform operation for selecting the candidate displayed in the candidate display area.

In the head-mounted display device according to the aspect of the invention, when the detecting section detects the pointer in a position corresponding to the candidate display area, the display control section may select, on the basis of at least any one of a movement, a shape, and a position of the detected pointer, any one of a plurality of the candidates displayed in the candidate display area.

According to the aspect of the invention with this configuration, it is possible to select any one of the plurality of candidates according to at least any one of the movement, the shape, and the position of the pointer.

In the head-mounted display device according to the aspect of the invention, when the detecting section detects the pointer in a position corresponding to a character of the candidate displayed in the display region, the display control section may select, on the basis of at least any one of a movement, a shape, and a position of the detected pointer, any one of characters of a plurality of the candidates displayed in the candidate display area.

According to the aspect of the invention with this configuration, it is possible to select any one of the characters of the plurality of candidates on the basis of a movement, a shape, and a position of the pointer moved to the position corresponding to the character of the candidate.

In the head-mounted display device according to the aspect of the invention, the display control section may cause the display section to display a plurality of the candidates and, when a moving direction of the pointer detected by the detecting section corresponds to any one of directions in which the candidate is displayed, select the candidate corresponding to the moving direction.

According to the aspect of the invention with this configuration, by moving the pointer in a direction in which the candidate that the user desires to select is displayed, it is possible to select the candidate that the user desires to select.

In the head-mounted display device according to the aspect of the invention, when the shape of the pointer detected by the detecting section keeps a same shape for a preset time or more, the display control section may cause the display section to display the candidate.

According to the aspect of the invention with this configuration, it is possible to cause the display section to display the candidate by keeping the shape of the pointer as the same shape for the preset time or more. For this reason, it is possible to cause the display section to display the candidate with simple operation.

In the head-mounted display device according to the aspect of the invention, when the position of the pointer detected by the detecting section overlaps a preset position, the display control section may cause the display section to display the candidate.

According to the aspect of the invention with this configuration, the candidate is displayed when the pointer overlaps the preset position. For this reason, it is possible to cause the display section to display the candidate with simple operation by the pointer.

In the head-mounted display device according to the aspect of the invention, when the pointer detected by the detecting section corresponds to a preset condition, the display control section may cause the display section to display the candidate.

According to the aspect of the invention with this configuration, the candidate is displayed when the shape of the pointer is set to a shape corresponding to the preset condition. For this reason, it is possible to cause the display section to display the candidate with simple operation.

In the head-mounted display device according to the aspect of the invention, the display control section may cause the display section to display, as the image indicating the detection area, an image indicating a detection area where a pointer including a left hand of the user is detected and an image indicating a detection area where a pointer including a right hand of the user is detected.

According to the aspect of the invention with this configuration, the image indicating the detection area of the pointer including the left hand of the user and the image indicating the detection area of the pointer including the right hand of the user are respectively displayed. Therefore, it is unnecessary to determine whether the pointer detected by the detecting section is the pointer including the left hand or the pointer including the right hand. It is possible to reduce a time in which the candidate is displayed and improve a probability that a candidate intended by the user is displayed.

In the head-mounted display device according to the aspect of the invention, the detecting section may detect, as the pointer, a first pointer including a left hand of the user and a second pointer including a right hand of the user, and the display control section may cause the display section to display, in the display region, a first operation image set as a target of operation of the first pointer detected by the detecting section and a second operation image set as a target of operation of the second pointer detected by the detecting section.

According to the aspect of the invention with this configuration, it is possible to cause the display section to display the first operation image operated by the first pointer including the left hand of the user and the second operation image operated by the second pointer including the right hand of the user. For this reason, it is possible to perform the operation of the first operation image by the first pointer and the operation of the second operation image by the second pointer.

In the head-mounted display device according to the aspect of the invention, the head-mounted display device may further include a control-information output section configured to output control information to an external device according to at least any one of the movement, the shape, and the position of the pointer detected by the detecting section.

According to the aspect of the invention with this configuration, the control information corresponding to at least any one of the movement, the shape, and the position of the pointer is output to the external device. For this reason, it is possible to operate the external device according to at least any one of the movement, the shape, and the position of the pointer.

In the head-mounted display device according to the aspect of the invention, the head-mounted display device may further include a control-information output section configured to output control information to an external device according to at least any one of the movement, the shape, and the position of the pointer detected by the detecting section, the detecting section may detect, as the pointer, a first pointer including a left hand of the user and a second pointer including a right hand of the user, and the control-information output section may output the control information including at least one of first information corresponding to operation of the first pointer detected by the detecting section and second information corresponding to operation of the second pointer detected by the detecting section.

According to the aspect of the invention with this configuration, the control information including at least one of the first information corresponding to the operation of the first pointer detected by the detecting section and the second information corresponding to the operation of the second pointer detected by the detecting section is output by the control-information output section. For this reason, it is possible to operate the external device according to the operation of the first pointer or the operation of the second pointer.

In the head-mounted display device according to the aspect of the invention, the head-mounted display device may further include a sound input section configured to input sound, and the detecting section may detect the pointer when the sound input section inputs preset sound.

According to the aspect of the invention with this configuration, it is possible to cause the head-mounted display device to start the detection of the pointer according to the preset sound.

In the head-mounted display device according to the aspect of the invention, the head-mounted display device may further include an operation detecting section configured to detect operation, and, when preset operation is detected by the operation detecting section, the detecting section may shift to a state in which the detecting section detects the pointer.

According to the aspect of the invention with this configuration, by performing the preset operation, it is possible to shift the head-mounted display device to the state in which the detecting section detects the pointer.

In the head-mounted display device according to the aspect of the invention, the head-mounted display device may further include a storing section configured to store at least either one of a gesture registration dictionary in which a gesture indicating a track of a preset movement of fingers of the user serving as the pointer and the candidate are associated and a hand sign registration dictionary in which a hand sign indicating a preset shape of the fingers and the candidate are associated, and the display control section may select the gesture or the hand sign according to matching of a movement or a shape of the fingers detected by the detecting section and the gesture registration dictionary or the hand sign registration dictionary and cause the display section to display the candidate corresponding to the selected gesture or hand sign.

According to the aspect of the invention with this configuration, it is possible to specify a gesture or a hand sign on the basis of a movement or a shape of the fingers of the user and cause the display section to display a candidate corresponding to the specified gesture or hand sign.

In the head-mounted display device according to the aspect of the invention, the head-mounted display device may further include a storing section configured to store external dictionary information for detecting the pointer associated with a motion of another user from a direction different from a detecting direction of the pointer associated with the motion of the user, and displaying a candidate corresponding to at least any one of a movement, a shape, and a position of the pointer associated with the motion of the other user detected from the different direction, and the display control section may specify, on the basis of the external dictionary information, the candidate corresponding to at least any one of the movement, the shape, and the position of the pointer associated with the motion of the other user and cause the display section to display the specified candidate.

According to the aspect of the invention with this configuration, it is possible to detect at least one of the movement, the shape, and the position of the pointer associated with the motion of the other user from the direction different from the detecting direction of the pointer associated with the motion of the user. It is possible to detect at least any one of the movement, the shape, and the position of the pointer associated with the motion of the other user and specify and display a candidate corresponding to the detected at least any one of the movement, the shape, and the position of the pointer. Therefore, it is unnecessary to detect the pointer from the detecting direction of the pointer associated with the motion of the user in order to detect the movement, the shape, and the position of the pointer associated with the motion of the other user. For this reason, it is unnecessary to change the detecting direction of the detecting section in order to detect the movement, the shape, and the position of the pointer associated with the motion of the other user. It is possible to reduce time and labor of the user.

In the head-mounted display device according to the aspect of the invention, the head-mounted display device may further include a communication section configured to communicate with an external head-mounted display device, and the head-mounted display device may transmit the external dictionary information to the external head-mounted display device with the communication section.

According to the aspect of the invention with this configuration, it is possible to transmit the external dictionary information to the external head-mounted display device not including the external dictionary information. Therefore, it is possible to detect at least any one of a movement, a shape, and a position of the pointer and display a candidate corresponding to a detection result in the external head-mounted display device.

In the head-mounted display device according to the aspect of the invention, the detecting section may optically detect the other user, and the display control section may cause, on the basis of a detection result of the detecting section, the display section to display, in the display region, a first detection area where at least any one of a movement, a shape, and a position of the pointer associated with the motion of the other user is optically detected and display, in the display region excluding the first detection area, a second detection area where at least any one of a movement, a shape, and a position of the pointer associated with the motion of the user is optically detected.

According to the aspect of the invention with this configuration, the first detection area for detecting the pointer associated with the motion of the other user and the second detection area for detecting the pointer associated with the motion of the user are displayed. For this reason, it is unnecessary to determine whether the detected pointer is the pointer corresponding to a movement of the user or the pointer associated with a movement of the other user. For this reason, it is possible to reduce a time required for recognition processing of the pointer and reduce a probability that a movement, a shape, and a position of the pointer are misrecognized.

In the head-mounted display device according to the aspect of the invention, the display control section may specify, on the basis of the external dictionary information, the candidate corresponding to at least any one of a movement, a shape, and a position of the pointer detected by the detecting section in the first detection area and specify, on the basis of the dictionary information, the candidate corresponding to at least any one of a movement, a shape, and a position of the pointer detected by the detecting section in the second detection area.

According to the aspect of the invention with this configuration, it is possible to specify a candidate corresponding to a movement, a shape, or a position of the pointer using a dictionary corresponding to a detecting direction in which the movement, the shape, and the position of the pointer are detected.

Another aspect of the invention is directed to a computer program executed by a computer mounted on a head-mounted display including: a display section configured to display an image in a display region to be transmitted through an outside scene and recognizable together with the outside scene; and a detecting section configured to detect a pointer associated with a motion of the user in a region including at least a range in which the image is transmitted through the display section, the head-mounted display device being mounted on a head of the user, the computer program causing the computer to execute: a procedure for causing the display section to display, in the display region, an image indicating a detection state in which the detecting section detects the pointer; and a procedure for causing the display section to display a candidate of input content corresponding to at least any one of a movement, a shape, and a position of the pointer detected by the detecting section.

Another aspect of the invention is directed to a control method for a head-mounted display including: a display section configured to display an image in a display region to be transmitted through an outside scene and recognizable together with the outside scene; and a detecting section configured to detect a pointer associated with a motion of the user in a region including at least a range in which the image is transmitted through the display section, the head-mounted display device being mounted on a head of the user, the control method including: causing the display section to display, in the display region, an image indicating a detection state in which the detecting section detects the pointer; and causing the display section to display a candidate of input content corresponding to at least any one of a movement, a shape, and a position of the pointer detected by the detecting section.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
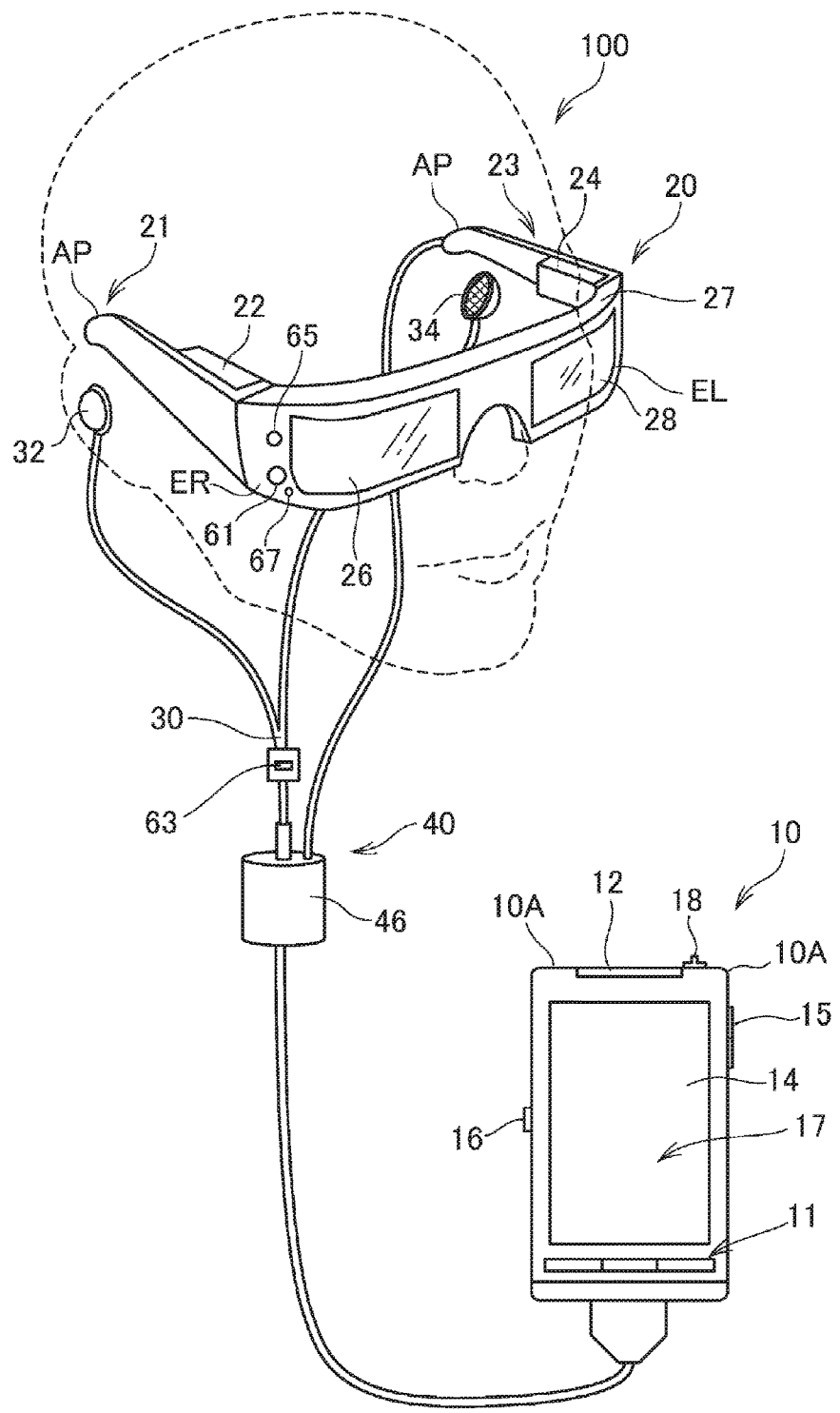
FIG. 1 is an exterior view of an HMD.

FIG. 1 is an exterior view showing an exterior configuration of an HMD (Head Mounted Display: head-mounted display device) 100 applied with the invention.

The HMD 100 is a display device including an image display section 20 (a display section) that is worn on the head of a user and causes the user to visually recognize a virtual image and a control device 10 that controls the image display section 20. A person wearing the image display section 20 on the head is referred to as user.

The control device 10 includes a flat box-shaped case 10A (also considered to be a housing or a main body) as shown in FIG. 1. The case 10A includes a button 11, an LED indicator 12, a track pad 14, an up/down key 15, a changeover switch 16, and a power switch 18. The button 11, the track pad 14, the up/down key 15, the changeover switch 16, and the power switch 18 are operation sections operated by the user. The LED indicator 12 functions as, for example, a sub-display section that displays an operation state of the HMD 100. The user can operate the HMD 100 by operating the operation sections. The control device 10 functions as a controller of the HMD 100.

The image display section 20 is a wearing body worn on the head of the user. In this embodiment, the image display section 20 has an eyeglass shape. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling corresponds to the middle of the forehead of the user in the worn state in which the user wears the image display section 20. In the front frame 27, nose pad sections in contact with the nose of the user in the worn state of the image display section 20 may be provided in the coupling position of the right light guide plate 26 and the left light guide plate 28. In this case, the image display section 20 can be held on the head of the user by the nose pad sections and the right holding section 21 and the left holding section 23. A belt (not shown in the figure) in contact with the back of the head of the user in the worn state of the image display section 20 may be coupled to the right holding section 21 and the left holding section 23. In this case, the image display section 20 can be held on the head of the user by the belt.

The right display unit 22 realizes display of an image by the right light guide plate 26. The right display unit 22 is provided in the right holding section 21 and located in the vicinity of the right temporal region of the user in the worn state. The left display unit 24 realizes display of an image by the left light guide plate 28. The left display unit 24 is provided in the left holding section 23 and located in the vicinity of the left temporal region of the user in the worn state.

The right light guide plate 26 and the left light guide plate 28 in this embodiment are optical sections formed of light transmissive resin or the like and are, for example, prisms. The right light guide plate 26 and the left light guide plate 28 guide image lights emitted by the right display unit 22 and the left display unit 24 to the eyes of the user.

Dimming plates (not shown in the figure) may be provided on the surfaces of the right light guide plate 26 and the left light guide plate 28. The dimming plates are thin plate-like optical elements having different transmittance depending on a wavelength region of light. The dimming plates function as so-called wavelength filters. The dimming plates are disposed to cover the front side of the front frame 27, which is the opposite side of the side of the eyes of the user. By selecting an optical characteristic of the dimming plates as appropriate, it is possible to adjust the transmittance of light in any wavelength region such as infrared light and ultraviolet light and it is possible to adjust a light amount of external light made incident on the right light guide plate 26 and the left light guide plate 28 from the outside and transmitted through the right light guide plate 26 and the left light guide plate 28.

The image display section 20 guides image lights respectively generated by the right display unit 22 and the left display unit 24 to the right light guide plate 26 and the left light guide plate 28. The image lights guided to the right light guide plate 26 and the left light guide plate 28 are made incident on the right eye and the left eye of the user and causes the user to visually recognize a virtual image. Consequently, the image display section 20 displays an image.

When external light is transmitted through the right light guide plate 26 and the left light guide plate 28 and made incident on the eyes of the user from the front of the user, the image lights forming the virtual image and the external light are made incident on the eyes of the user. Visibility of the virtual image is affected by the strength of the external light. For this reason, for example, by attaching the dimming plates to the front frame 27 and selecting or adjusting the optical characteristic of the diming plate as appropriate, it is possible to adjust easiness of visual recognition of the virtual image. In a typical example, it is possible to use diming plates having light transmittance enough for enabling the user wearing the HMD 100 to visually recognize at least a scene on the outside. When the dimming plates are used, it is possible to expect an effect of protecting the right light guide plate 26 and the left light guide plate 28 and preventing damage, adhesion of soil, and the like to the right light guide plate 26 and the left light guide plate 28. The dimming plates may be detachably attachable to the front frame 27 or respectively to the right light guide plate 26 and the left light guide plate 28. A plurality of kinds of dimming plates may be able to be alternately attached. The dimming plates may be omitted.

A camera 61 is disposed in the front frame 27 of the image display section 20. The configuration and the disposition of the camera 61 are determined to image the direction of an outside scene visually recognized by the user in a state in which the user wears the image display section 20. For example, the camera 61 is provided in a position where the camera 61 does not block external light transmitted through the right light guide plate 26 and the left light guide plate 28 on the front surface of the front frame 27. In the example shown in FIG. 1, the camera 61 is disposed on the end portion ER side of the front frame 27. However, the camera 61 may be disposed on the end portion EL side or may be disposed in a coupling section of the right light guide plate 26 and the left light guide plate 28. The camera 61 is equivalent to the "detecting section" in the aspect of the invention. A range of an outside scene visually recognized by the user in the state in which the user wears the image display section 20, that is, an imaging range of the camera 61 is equivalent to the "region including at least a range in which the image is transmitted through the display section" in the aspect of the invention. The camera 61 optically detects a pointer or the user.

The camera 61 is a digital camera including an imaging device such as a CCD or a CMOS and an imaging lens. The camera 61 in this embodiment is a monocular camera but may be configured by a stereo camera. The camera 61 images at least a part of an outside scene (a real space) in a front side direction of the HMD 100, in other words, a field of vision direction of the user in a state in which the HMD 100 is mounted. In another expression, the camera 61 images a range or a direction overlapping the field of vision of the user and images a direction gazed by the user. The direction and the breadth of an angle of view of the camera 61 can be set as appropriate. In this embodiment, as explained below, the angle of view of the camera 61 includes the outside world visually recognized by the user through the right light guide plate 26 and the left light guide plate 28. More desirably, the angle of view of the camera 61 is set such that the camera 61 can image the entire field of vision of the user visually recognizable through the right light guide plate 26 and the left light guide plate 28.

Figure 5:
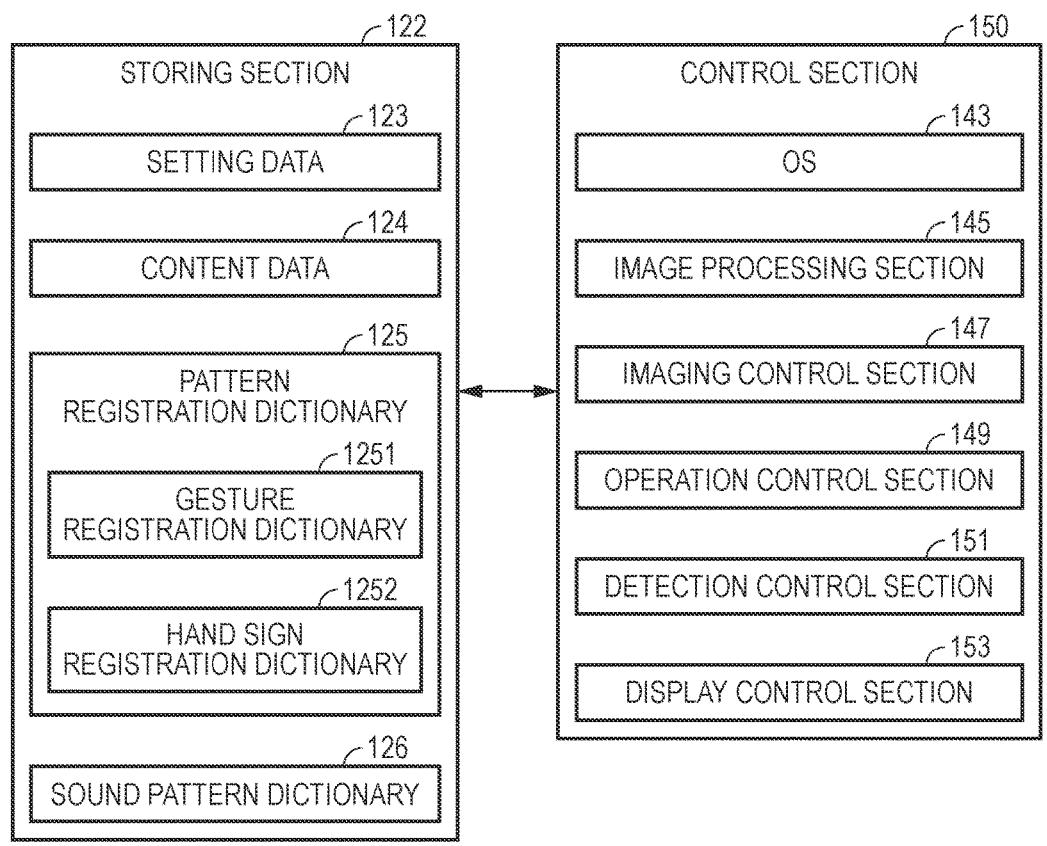
FIG. 5 is a functional block diagram of a control device.

The camera 61 executes imaging according to control by an imaging control section 147 included in a control section 150 (FIG. 5). The camera 61 outputs picked-up image data picked up by the imaging to the control section 150 via an interface 211 explained below.

The HMD 100 may include a distance sensor (not shown in the figure) that detects a distance to a measurement target object located in a preset measurement direction. The distance sensor can be disposed in, for example, a coupling portion of the right light guide plate 26 and the left light guide plate 28 in the front frame 27. In this case, in the worn state of the image display section 20, the position of the distance sensor is substantially the middle of both the eyes of the user in the horizontal direction and above both the eyes of the user in the vertical direction. The measurement direction of the distance sensor can be set to, for example, the front side direction of the front frame 27. In other words, the measurement direction is a direction overlapping the imaging direction of the camera 61. The distance sensor can be configured to include, for example, a light source such as an LED or a laser diode and a light receiving section that receives reflected light of light emitted by the light source and reflected on the measurement target object. The distance sensor only has to execute triangulation processing and distance measurement processing based on a time difference according to control by the control section 150. The distance sensor may be configured to include a sound source that emits ultrasound and a detecting section that receives the ultrasound reflected on the measurement target object. In this case, the distance sensor only has to execute the distance measurement processing on the basis of a time difference until the reflection of the ultrasound according to the control by the control section 150.

Figure 2:
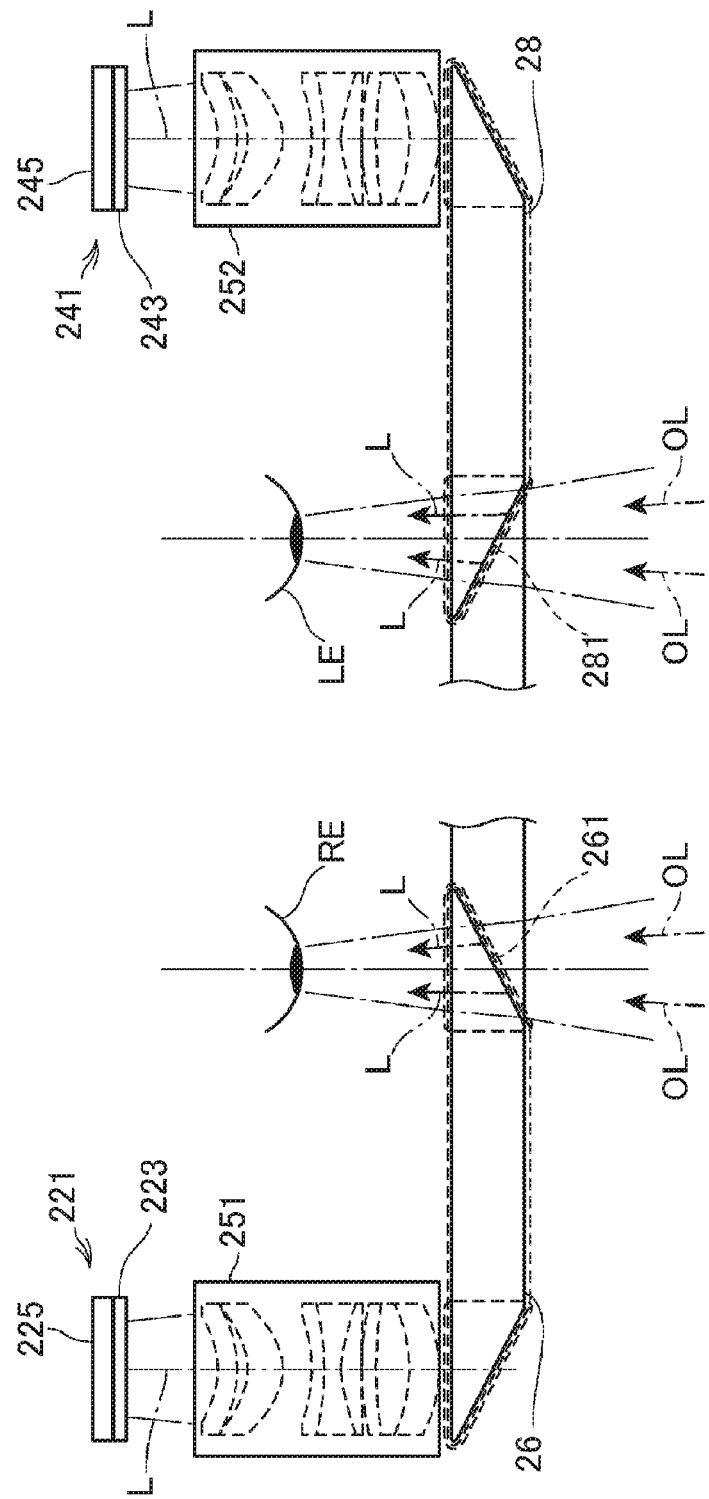
FIG. 2 is a main part plan view showing the configuration of an optical system of the HMD.

FIG. 2 is a main part plan view showing the configuration of an optical system included in the image display section 20. In FIG. 2, a left eye LE and a right eye RE of the user are shown for explanation.

As shown in FIG. 2, the right display unit 22 and the left display unit 24 are symmetrically configured. As a component for causing the right eye RE of the user to visually recognize an image, the right display unit 22 includes an OLED (Organic Light Emitting Diode) unit 221 that emits image light and a right optical system 251 including a lens group for guiding image light L emitted by the OLED unit 221. The image light L is guided to the right light guide plate 26 by the right optical system 251.

The OLED unit 221 includes an OLED panel 223 and an OLED driving circuit 225 that drives the OLED panel 223. The OLED panel 223 is a self-emitting display panel configured by arranging, in a matrix shape, light emitting elements that emit lights with organic electroluminescence and respectively emit color lights of R (red), G (green), and B (blue). The OLED panel 223 includes a plurality of pixels, one pixel of which is a unit including one each of R, G, and B elements. The OLED panel 223 forms an image with the pixels arranged in the matrix shape. The OLED driving circuit 225 executes selection of a light emitting element included in the OLED panel 223 and energization to the light emitting element and causes the light emitting element of the OLED panel 223 to emit light according to the control by the control section 150 (FIG. 5). The OLED driving circuit 225 is fixed to a rear surface, that is, the rear side of a light emitting surface of the OLED panel 223 by bonding or the like. The OLED driving circuit 225 may be configured by, for example, a semiconductor device that drives the OLED panel 223 and mounted on a substrate (not shown in the figure) fixed to the rear surface of the OLED panel 223. A temperature sensor 217 is mounted on the substrate.

Note that the OLED panel 223 may be configured by arranging, in a matrix shape, light emitting elements that emit white light and disposing color filters corresponding to the colors of R, G, and B to be superimposed one on top of another. An OLED panel 223 of a WRGB configuration including a light emitting element that emits W (white) light in addition to the light emitting elements that respectively radiate the color lights of R, G, and B may be used.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light in the inside of the right light guide plate 26. The image light L is guided to the right eye RE side through a plurality of times of reflection in the inside of the right light guide plate 26. A half mirror 261 (a reflection surface) located in front of the right eye RE is formed in the right light guide plate 26. The image light L is reflected on the half mirror 261 and emitted from the right light guide plate 26 toward the right eye RE. The image light L forms an image on the retina of the right eye RE and causes the user to recognize the image.

The left display unit 24 includes, as components for causing the left eye LE of the user to visually recognize an image, an OLED unit 241 that emits image light and a left optical system 252 including a lens group for guiding the image light L emitted by the OLED unit 241. The image light L is guided to the left light guide plate 28 by the left optical system 252.

The OLED unit 241 includes an OLED panel 243 and an OLED driving circuit 245 that drives the OLED panel 243. The OLED panel 243 is a self-emitting display panel configured the same as the OLED panel 223. The OLED driving circuit 245 executes selection of a light emitting element included in the OLED panel 243 and energization to the light emitting element and causes the light emitting element of the OLED panel 243 to emit light according to the control by the control section 150 (FIG. 5). The OLED driving circuit 245 is fixed to a rear surface, that is, the rear side of a light emitting surface of the OLED panel 243 by bonding or the like. The OLED driving circuit 245 may be configured by, for example, a semiconductor device that drives the OLED panel 243 and mounted on a substrate (not shown in the figure) fixed to the rear surface of the OLED panel 243. A temperature sensor 239 is mounted on the substrate.

The left optical system 252 includes a collimate lens that changes the image light L emitted from the OLED panel 243 to a light beam in a parallel state. The image light L changed to the light beam in the parallel state by the collimate lens is made incident on the left light guide plate 28. The left light guide plate 28 is an optical element in which a plurality of reflection surfaces that reflect the image light L are formed and is, for example, a prism. The image light L is guided to the left eye LE side through a plurality of times of reflection in the inside of the left light guide plate 28. A half mirror 281 (a reflection surface) located in front of the left eye LE is formed in the left light guide plate 28. The image light L is reflected on the half mirror 281 and emitted from the left light guide plate 28 toward the left eye LE. The image light L forms an image on the retina of the left eye LE and causes the user to visually recognize the image.

With this configuration, the HMD 100 functions as a see-through type display device. That is, the image light L reflected on the half mirror 261 and external light OL transmitted through the right light guide plate 26 are made incident on the right eye RE of the user. The image light L reflected on the half mirror 281 and the external light OL transmitted through the half mirror 281 are made incident on the left eye LE. In this way, the HMD 100 makes the image light L of the image processed in the inside and the external light OL incident on the eyes of the user to be superimposed one on top of the other. For the user, the outside scene is seen through the right light guide plate 26 and the left light guide plate 28. An image formed by the image light L is visually recognized over the outside scene.

The half mirrors 261 and 281 are image extracting sections that reflect image lights respectively output by the right display unit 22 and the left display unit 24 and extract images. The half mirrors 261 and 281 can be considered display sections.

Note that the left optical system 252 and the left light guide plate 28 are collectively referred to as "left light guide section" as well. The right optical system 251 and the right light guide plate 26 are collectively referred to as "right light guide section" as well. The configuration of the right light guide section and the left light guide section is not limited to the example explained above. Any system can be used as long as a virtual image is formed in front of the eyes of the user using the image lights. For example, a diffraction grating may be used or a semitransmitting reflection film may be used.

Referring back to FIG. 1, the control device 10 and the image display section 20 are connected by a connection cable 40. The connection cable 40 is detachably connected to a connector (not shown in the figure) provided in a lower part of the case 10A and is connected to various circuits provided in the inside of the image display section 20 from the distal end of the left holding section 23. The connection cable 40 may include a metal cable or an optical fiber for transmitting digital data and may include a metal cable for transmitting an analog signal. A connector 46 is provided halfway in the connection cable 40. The connector 46 is a jack for connecting a stereo mini-plug. The connector 46 and the control device 10 are connected by, for example, a line for transmitting an analog sound signal. In the configuration example shown in FIG. 1, a headset 30 including a right earphone 32 and a left earphone 34 configuring a stereo head phone and a microphone 63 is connected to the connector 46.

The control device 10 and the image display section 20 may be connected by radio. For example, a configuration may be adopted in which the control device 10 and the image display section 20 transmit and receive control signals and data to and from each other through wireless communication conforming to a standard such as a Bluetooth (registered trademark) or a wireless LAN (including Wi-Fi (registered trademark)).

Figure 4:
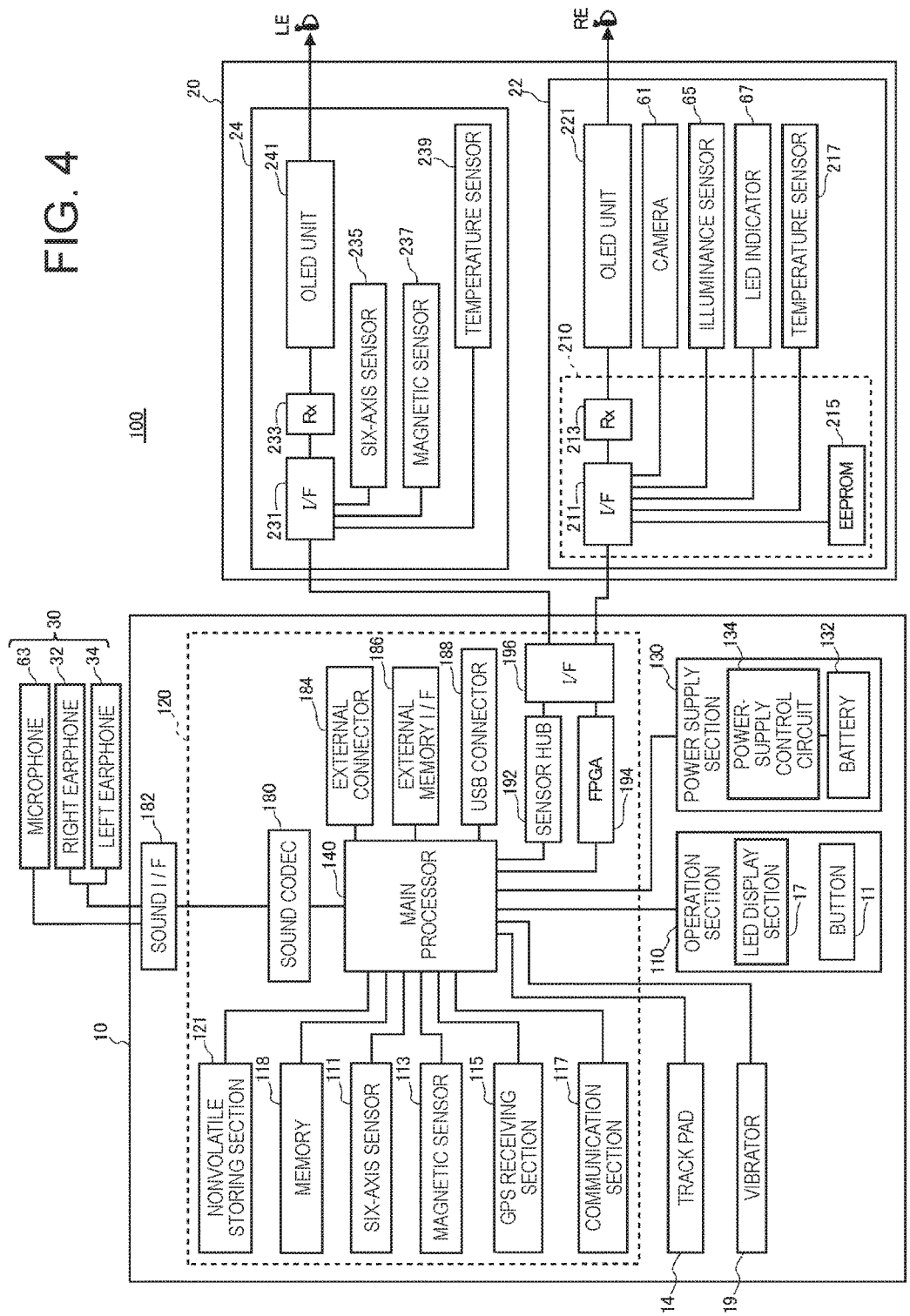
FIG. 4 is a block diagram of the HMD.

For example, as shown in FIG. 1, the microphone 63 is disposed such that a sound collecting section of the microphone 63 faces aline of sight direction of the user. The microphone 63 collects sound and outputs a sound signal to a sound interface 182 (FIG. 4). For example, the microphone 63 may be a monaural microphone or a stereo microphone, may be a microphone having directivity, or may be a nondirectonal microphone. The microphone 63 is equivalent to the "sound input section" in the aspect of the invention.

The control device 10 includes, as operation sections operated by the user, the button 11, the LED indicator 12, the track pad 14, the up/down key 15, the changeover switch 16, and the power switch 18. These operation sections are disposed on the surface of the case 10A.

The button 11 includes keys and switches for operating the control device 10. The keys and the switches are displaced by pressing operation. For example, the button 11 includes a menu key, a home key, and a "return" key for performing operation concerning an operating system 143 (see FIG. 5) executed by the control device 10.

The LED indicator 12 is lit or extinguished according to an operation state of the HMD 100. The up/down key 15 is used to input an instruction for an increase or a reduction of sound volume output from the right earphone 32 and the left earphone 34 and instruct an increase and a reduction of brightness of display of the image display section 20. The changeover switch 16 is a switch for changing over an input corresponding to operation of the up-down key 15. The power switch 18 is a switch for changing over ON/OFF of a power supply of the HMD 100 and is, for example, a slide switch.

The track pad 14 includes an operation surface for detecting contact operation and outputs an operation signal according to operation on the operation surface. A detection system on the operation surface is not limited. An electrostatic system, a pressure detection system, an optical system, or other systems can be adopted. Contact (touch operation) on the track pad 14 is detected by a touch sensor (not shown in the figure). An LED display section 17 is provided in the track pad 14. The LED display section 17 includes a plurality of LEDs. Lights of the respective LEDs are transmitted through the track pad 14 and display icons and the like for operation. The icons and the like function as software buttons.

Figure 3:
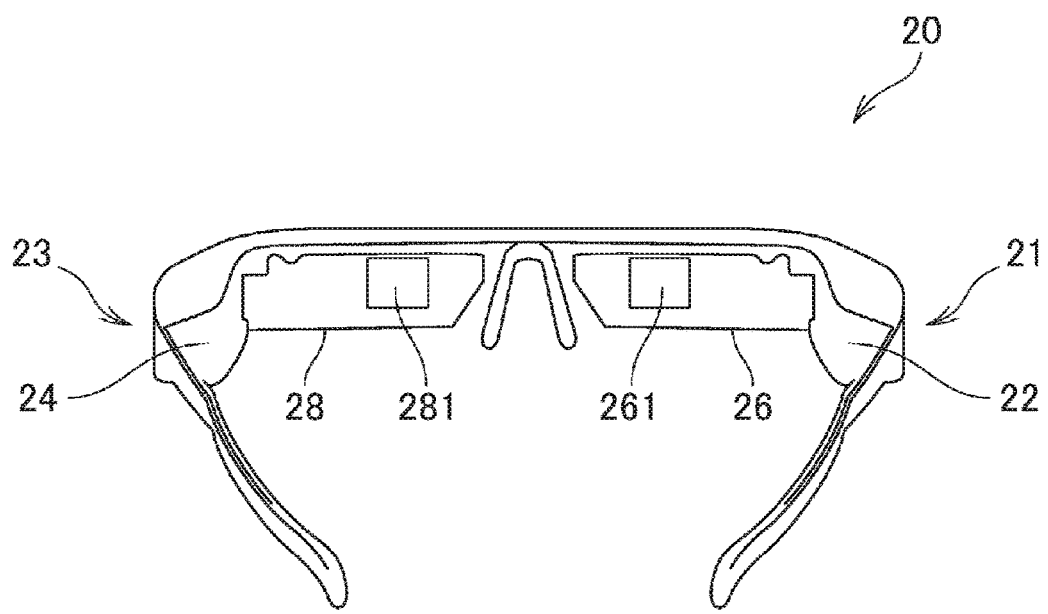
FIG. 3 is a perspective view showing the configuration of an image display section.

FIG. 3 is a perspective view showing the configuration of the image display section 20 and shows a main part configuration of the image display section 20 viewed from the head side of the user. FIG. 3 shows a side in contact with the head of the user of the image display section 20, in other words, a side visible to the right eye RE and the left eye LE of the user. In other words, the rear side of the right light guide plate 26 and the left light guide plate 28 is visible.

In FIG. 3, the half mirror 261 for irradiating image light on the right eye RE of the user and the half mirror 281 for irradiating image light on the left eye LE of the user are seen as substantially square regions. The entire right light guide plate 26 and left light guide plate 28 including the half mirrors 261 and 281 transmit external light as explained above. For this reason, for the user, an outside scene is visually recognized through the entire right light guide plate 26 and left light guide plate 28 and rectangular display images are visually recognized in the positions of the half mirrors 261 and 281.

The camera 61 is disposed at the end portion on the right side in the image display section 20 and images a direction that both the eyes of the user face, that is, the front for the user. An optical axis of the camera 61 is set in a direction including aline of sight direction of the right eye RE and the left eye LE. An outside scene that can be visually recognized in a state in which the user wears the HMD 100 is not always infinity. For example, when the user gazes a target object located in front of the user with both the eyes, the distance from the user to the target object is often approximately 30 cm to 10 m and more often approximately 1 m to 4 m. Therefore, concerning the HMD 100, standards of an upper limit and a lower limit of the distance from the user to the target object during normal use may be set. The standards may be calculated by researches and experiments or the user may set the standards. When an optical axis and an angle of view of the camera 61 are desirably set such that the target object is included in the angle of view when the distance to the target object during the normal use is equivalent to the set standard of the upper limit and when the distance is equivalent to the set standard of the lower limit.

In general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. Further, a stable field of fixation in which a gazing point gazed by the human is quickly and stably seen is approximately 60 to 90 degrees in the horizontal direction and approximately 45 to 70 degrees in the vertical direction. When the gazing point is a target object located in front of the user, in the field of view of the user, a field of view of approximately 30 degree in the horizontal direction and approximately 20 degrees in the vertical direction centering on respective lines of sight of the right eye RE and the left eye LE is the effective field of view. A field of view of approximately 60 to 90 degrees in the horizontal direction and approximately 45 to 70 degrees in the vertical direction is the stable field of fixation. An angle of approximately 200 degrees in the horizontal direction and approximately 125 degrees in the vertical direction is the angular field of view. An actual field of view visually recognized by the user through the right light guide plate 26 and the left light guide plate 28 can be referred to as real field of view (FOV). In the configuration in this embodiment shown in FIGS. 1 and 2, the real field of view is equivalent to an actual field of view visually recognized by the user through the right light guide plate 26 and the left light guide plate 28. The real field of view is narrower than the angular field of view and the stable field of fixation but is wider than the effective field of view.

The angle of view of the camera 61 desirably enables imaging of a range wider than the field of view of the user. Specifically, the angle of view is desirably wider than at least the effective field of view of the user. The angle of view is more desirably wider than the real field of view of the user. The angle of view is still more desirably wider than the stable field of fixation. The angle of view is most desirable wider than the angular field of view of both the eyes of the user.

The camera 61 may include a so-called wide-angle lens as an imaging lens and may be capable of imaging a wide angle of view. The wide-angle lens may include lenses called super-wide angle lens and semi-wide angle lens. The wide-angle lens may be a single focus lens or may be a zoom lens. The camera 61 may include a lens group including a plurality of lenses.

FIG. 4 is a block diagram showing the configurations of the sections configuring the HMD 100.

The control device 10 includes a main processor 140 that executes a computer program and controls the HMD 100. A memory 118 and a nonvolatile storing section 121 are connected to the main processor 140. The track pad 14 and the operation section 110 are connected to the main processor 140 as input devices. A six-axis sensor 111 and a magnetic sensor 113 are connected to the main processor 140 as sensors. A GPS receiving section 115, a communication section 117, a beacon receiving section 119, a sound codec 180, an external connector 184, an external memory interface 186, a USB connector 188, a sensor hub 192, and an FPGA 194 are connected to the main processor 140. These sections function as interfaces with the outside. The communication section 117 is equivalent to the "control-information output section" in the aspect of the invention.

The main processor 140 is mounted on a controller board 120 incorporated in the control device 10. The memory 118, the nonvolatile storing section 121, and the like may be mounted on the controller board 120 in addition to the main processor 140. In this embodiment, the six-axis sensor 111, the magnetic sensor 113, the GPS receiving section 115, the communication section 117, the memory 118, the nonvolatile storing section 121, the sound coded 180, and the like are mounted on the controller board 120. The external connector 184, the external memory interface 186, the USB connector 188, the sensor hub 192, the FPGA 194, and an interface 196 may be mounted on the controller board 120.

The memory 118 configures a work area where, when the main processor 140 executes a computer program, the main processor 140 temporarily stores the computer program to be executed and data to be processed. The nonvolatile storing section 121 is configured by a flash memory or an eMMC (embedded Multi Media Card). The nonvolatile storing section 121 stores the program to be executed by the main processor 140 and various data to be processed by the main processor 140 executing the computer program.

The main processor 140 detects contact operation on the operation surface of the track pad 14 and acquires an operation position on the basis of an operation signal input from the track pad 14.

The operation section 110 includes the button 11 and the LED display section 17. When an operator such as a button or a switch included in the button 11 is operated, the operation section 110 outputs an operation signal corresponding to the operated operator to the main processor 140.

The LED display section 17 controls lighting and extinction of the LED indicator 12 according to control by the main processor 140. The LED display section 17 may include an LED (not shown in the figure) disposed right under the track pad 14 and a driving circuit that lights the LED. In this case, the LED display section 17 lights, flashes, and extinguishes the LED according to the control by the main processor 140.

The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modulating the sensors may be adopted.

The magnetic sensor 113 is, for example, a three-axis terrestrial magnetism sensor.

The six-axis sensor 111 and the magnetic sensor 113 output detection values to the main processor 140 according to a sampling cycle designated in advance. The six-axis sensor 111 and the magnetic sensor 113 output, in response to a request of the main processor 140, the detection values to the main processor 140 at timing designated by the main processor 140.

The GPS receiving section 115 includes a not-shown GPS antenna and receives a GPS signal transmitted from a GPS satellite. The GPS receiving section 115 outputs the received GPS signal to the main processor 140. The GPS receiving section 115 measures signal strength of the received GPS signal and outputs the signal strength to the main processor 140. As the signal strength, information such as received signal strength indication (RSSI), electric field strength, magnetic field strength, and a signal to noise ratio (SNR) can be used.

The communication section 117 executes wireless communication between the HMD 100 and an external device. The communication section 117 includes an antenna, an RF circuit, a baseband circuit, and a communication control circuit. Alternatively, the communication section 117 is configured by a device obtained by integrating the antenna, the RF circuit, the baseband circuit, and the communication control circuit. The communication section 117 performs wireless communication conforming to a standard such as Bluetooth or a wireless LAN (including Wi-Fi).

The sound interface 182 is an interface for inputting and outputting sound signals. In this embodiment, the sound interface 182 includes the connector 46 (FIG. 1) provided in the connection cable 40. The connector 46 is connected to the headset 30. A sound signal output by the sound interface 182 is input to the right earphone 32 and the left earphone 34. Consequently, the right earphone 32 and the left earphone 34 output sound. The microphone 63 included in the headset 30 collects sound and outputs a sound signal to the sound interface 182. The sound signal input from the microphone 63 to the sound interface 182 is input to the external connector 184.

The sound codec 180 is connected to the sound interface 182 and performs encoding and decoding of sound signals input and output via the sound interface 182. The sound codec 180 may include an A/D converter that performs conversion from an analog sound signal into digital sound data and a D/A converter that perform opposite conversion of the conversion. For example, the HMD 100 in this embodiment outputs sound with the right earphone 32 and the left earphone 34 and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector that connects an external device that communicates with the main processor 140. For example, when the external device is connected to the main processor 140 and debugging of a computer program executed by the main processor 140 and collection of a log of the operation of the HMD 100 are performed, the external connector 184 is an interface that connects the external device.

The external memory interface 186 is an interface capable of connecting a portable memory device. The external memory interface 186 includes, for example, a memory card slot into which a card-type recording medium is inserted to enable reading of data and an interface circuit. A size, a shape, and a standard of the card-type recording medium in this case are not limited and can be changed as appropriate.

The USB (Universal Serial Bus) connector 188 includes a connector and an interface circuit conforming to the USB standard. A USB memory device, a smartphone, a computer, and the like can be connected to the USB connector 188. A size and a shape of the USB connector 188 and a version of a USB standard matching the USB connector 188 can be selected and changed as appropriate.

The image display section 20 is connected to the sensor hub 192 and the FPGA 194 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission performed via the interface 196.

The HMD 100 includes a vibrator 19. The vibrator 19 includes a motor and an eccentric rotor (both of which are not shown in the figure) and may include other necessary components. The vibrator 19 rotates the motor according to the control by the main processor 140 to thereby generate vibration. For example, when operation on the operation section 110 is detected, when the power supply of the HMD 100 is turned on and off, or in other cases, the HMD 100 generates vibration with the vibrator 19 in a predetermined vibration pattern.

The right display unit 22 and the left display unit 24 of the image display section 20 are respectively connected to the control device 10. As shown in FIG. 1, in the HMD 100, the connection cable 40 is connected to the left holding section 23. A wire joined to the connection cable 40 is laid inside the image display section 20. The right display unit 22 and the left display unit 24 are respectively connected to the control device 10.

The right display unit 22 includes a display unit board 210. An interface (I/F) 211 connected to the interface 196, a receiving section (Rx) 213 that receives data input from the control device 10 via the interface 211, and an EEPROM 215 are mounted on the display unit board 210.

The interface 211 connects the receiving section 213, the EEPROM 215, the temperature sensor 217, the camera 61, an illuminance sensor 65, and an LED indicator 67 to the control device 10.

The EEPROM (Electrically Erasable Programmable Read-Only Memory) 215 stores various data to enable the main processor 140 to read the data. The EEPROM 215 stores, for example, data concerning a light emission characteristic and a display characteristic of the OLED units 221 and 241 included in the image display section 20 and data concerning characteristics of the sensors included in the right display unit 22 or the left display unit 24. Specifically, the EEPROM 215 stores parameters related to gamma correction of the OLED units 221 and 241, data for compensating for detection values of the temperature sensors 217 and 239, and the like. These data are generated by a test during factory shipment of the HMD 100 and written in the EEPROM 215. After the shipment, the main processor 140 can perform processing using the data of the EEPROM 215.

The camera 61 executes imaging according to a signal input via the interface 211 and outputs picked-up image data picked up by the imaging or a signal indicating an imaging result to the control device 10.

As shown in FIG. 1, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity).

As shown in FIG. 1, the LED indicator 67 is disposed near the camera 61 at the end portion ER of the front frame 27. The LED indicator 67 is lit during execution of imaging by the camera 61 to inform that the imaging is being performed.

The temperature sensor 217 detects temperature and outputs a voltage value or a resistance value corresponding to the detected temperature as a detection value. The temperature sensor 217 is mounted on the rear surface side of the OLED panel 223 (FIG. 2). The temperature sensor 217 may be mounted on, for example, the same substrate as the OLED driving circuit 225. With this configuration, the temperature sensor 217 mainly detects the temperature of the OLED panel 223.

The receiving section 213 receives data transmitted by the main processor 140 via the interface 211. When receiving image data of an image displayed in the OLED unit 221, the receiving section 213 outputs the received image data to the OLED driving circuit 225 (FIG. 2).

The left display unit 24 includes a display unit board 210. An interface (I/F) 231 connected to the interface 196 and a receiving section (Rx) 233 that receives data input from the control device 10 via the interface 231 are mounted on the display unit board 210. A six-axis sensor 235 and a magnetic sensor 237 are mounted on the display unit board 210.

The interface 231 connects the receiving section 233, the six-axis sensor 235, the magnetic sensor 237, and the temperature sensor 239 to the control device 10.

The six-axis sensor 235 is a motion sensor (an inertial sensor) including a three-axis acceleration sensor and a three-axis gyro (angular velocity) sensor. As the six-axis sensor 235, an IMU obtained by modulating the sensors may be adopted.

The magnetic sensor 237 is, for example, a three-axis terrestrial magnetism sensor.

The temperature sensor 239 detects temperature and outputs a voltage value or a resistance value corresponding to the detected temperature as a detection value. The temperature sensor 239 is mounted on the rear surface side of the OLED panel 243 (FIG. 2). The temperature sensor 239 may be mounted on, for example, the same substrate as the OLED driving circuit 245. With this configuration, the temperature sensor 239 mainly detects the temperature of the OLED panel 243.

The temperature sensor 239 may be incorporated in the OLED panel 243 or the OLED driving circuit 245. The substrate may be a semiconductor substrate. Specifically, when the OLED panel 243 functioning as an Si-OLED is mounted as an integrated circuit on an integrated semiconductor chip together with the OLED driving circuit 245 and the like, the temperature sensor 239 may be mounted on the semiconductor chip.

The camera 61, the illuminance sensor 65, and the temperature sensor 217 included in the right display unit 22 and the six-axis sensor 235, the magnetic sensor 237, and the temperature sensor 239 included in the left display unit 24 are connected to the sensor hub 192. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a function of temporarily retaining the detection values of the sensors according to the timing of the output to the main processor 140. The sensor hub 192 may include a function of coping with differences in signal formats or data formats of output values of the sensors, converting the output values into data of a standardized data format, and outputting the data to the main processor 140.

The sensor hub 192 starts and stops energization to the LED indicator 67 according to the control by the main processor 140 and lights or extinguishes the LED indicator 67 according to timing when the camera 61 starts and ends imaging.

The control device 10 includes a power supply section 130 and operates with electric power supplied from the power supply section 130. The power supply section 130 includes a chargeable battery 132 and a power-supply control circuit 134 that performs detection of a residual capacity of the battery 132 and control of charging to the battery 132. The power-supply control circuit 134 is connected to the main processor 140 and outputs a detection value of the residual capacity of the battery 132 or a detection value of a voltage to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

FIG. 5 is a functional block diagram of a storing section 122 and the control section 150 configuring a control system of the control device 10. The storing section 122 shown in FIG. 5 is a logical storing section configured by the nonvolatile storing section 121 (FIG. 4) and may include the EEPROM 215. The main processor 140 executes a computer program, whereby the control section 150 and various functional sections included in the control section 150 are formed according to cooperation of software and hardware. The control section 150 and the functional sections included in the control section 150 are configured by, for example, the main processor 140, the memory 118, and the nonvolatile storing section 121.

The control section 150 executes various kinds of processing using data stored in the storing section 122 and controls the HMD 100.

The storing section 122 stores various data to be processed by the control section 150. Specifically, the storing section 122 stores setting data 123, content data 124, a pattern registration dictionary 125, and a sound pattern dictionary 126.

The setting data 123 includes various setting values for setting the operation of the HMD 100. When the control section 150 uses parameters, a determinant, an arithmetic expression, an LUT (Look UP Table), and the like when controlling the HMD 100, the parameters, the determinant, the arithmetic expression, the LUT (Look UP Table), and the like may be included in the setting data 123.

The content data 124 is data of contents including a display image and a video displayed by the image display section 20 according to the control by the control section 150. The content data 124 includes image data or video data. The content data 124 may include sound data. The content data 124 may include image data of a plurality of images. In this case, the plurality of images are not limited to images simultaneously displayed on the image display section 20.

When contents are displayed by the image display section 20, the content data 124 may be contents of a bidirectional type for which operation of the user is received by the control device 10 and the control section 150 executes processing corresponding to the received operation. In this case, the content data 124 may include image data of a menu screen displayed when operation is received and data for deciding processing corresponding to items included in the menu screen.

The pattern registration dictionary 125 includes a gesture registration dictionary 1251 and a hand sign registration dictionary 1252.

The gesture registration dictionary 1251 is a dictionary in which information for specifying a gesture and information indicating characters and signs (hereinafter referred to as character information) are registered in association with each other. The gesture is a movement of fingers for forming preset shapes of the fingers in preset order. The information for specifying a gesture is information indicating shapes and positional relations of the fingers in each of states of the fingers forming the gesture. For example, it is assumed that the gesture is a motion for opening a clenched hand, that is, a motion for opening a hand in a state of "rock" to change the state to a state of "paper". In this case, the information for specifying a gesture includes information indicating a shape and a positional relation of the fingers for specifying the state of "rock" and information indicating a shape and a positional relation of the fingers for specifying the state of "paper".

The hand sign registration dictionary 1252 is a dictionary in which information for specifying a hand sign and character information are registered in association with each other. The hand sign indicates a preset stationary shape and a preset stationary position of a hand or fingers. The information for specifying a hand sign is information indicating a position and a shape of the hand or the fingers.

In the gesture registration dictionary 1251, the information for specifying a gesture and functions of the HMD 100 and an external device operated by the specified gesture may be registered in association with each other. Similarly, in the hand sign registration dictionary 1252, the information for specifying a hand sign and functions of the HMD 100 and an external device operated by the specified hand sign may be registered in association with each other.

For example, when an audio function of the HMD 100 is operated by a gesture or a hand sign, an operation item of the audio function such as volume control or music selection is registered in association with information for specifying a gesture or a hand sign associated with the operation item.

When an external device is operated by a gesture or a hand sign, an operation item capable of operating the external device is registered in association with information for specifying a gesture or a hand sign associated with the operation item. For example, when the external device is an electric knife, an operation item of operation for turning on and off a power supply of the electric knife or operation for increasing or reducing a current amount energized to the electric knife is registered in association with information for specifying a gesture and a hand sign associated with the operation item.

When different kinds of operation are respectively performed by the left hand and the right hand, different kinds of operation are respectively associated with a gesture or a hand sign of the left hand and a gesture or a hand sign of the right hand.

That is, in the gesture registration dictionary 1251, information for specifying a gesture of the left hand and operation associated with the gesture are registered in association with each other. In the gesture registration dictionary 1251, information for specifying a gesture of the right hand and operation associated with the gesture are registered in association with each other. In the hand sign registration dictionary 1252, information for specifying a hand sign of the left hand and operation associated with the hand sign are registered in association with each other. In the hand sign registration dictionary 1252, information for specifying a hand sign of the right hand and operation associated with the hand sign are registered in association with each other.

The storing section 122 stores the sound pattern dictionary 126.

The sound pattern dictionary 126 is a dictionary in which preset sound data is registered. In the sound pattern dictionary 126, for example, sound data of a finger snap, which is a motion for cracking a finger, and sound data of knock sound of patting a track pad 14 or the like are registered.

The control section 150 has functions of an operating system (OS) 143, an image processing section 145, an imaging control section 147, an operation control section 149, a detection control section 151, and a display control section 153. The imaging control section 147 is equivalent to the "detecting section" in the aspect of the invention. The detection control section 151 is equivalent to the "operation detecting section" in the aspect of the invention.

The function of the operating system 143 is a function of the control program stored by the storing section 122. The other sections are functions of application programs executed on the operating system 143.

The image processing section 145 generates, on the basis of image data of an image or a video displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like.

The image processing section 145 may perform, according to necessity, resolution conversion processing for converting resolution of the image data into resolution suitable for the right display unit 22 and the left display unit 24. The image processing section 145 may execute image adjustment processing for adjusting luminance and chroma of the image data, 2D/3D conversion processing for creating 2D image data from 3D image data or creating 3D image data from 2D image data, and the like. When the image processing section 145 executes these kinds of image processing, the image processing section 145 generates a signal for displaying an image on the basis of the image data after the processing and transmits the signal to the image display section 20 via the connection cable 40.

Besides being realized by the main processor 140 executing a computer program, the image processing section 145 may be configured by hardware (e.g., a DSP (Digital Signal Processor)) different from the main processor 140.

The imaging control section 147 controls the camera 61 to execute imaging, generates picked-up image data, and temporarily stores the picked-up image data in the storing section 122. When the camera 61 is configured as a camera unit including a circuit that generates picked-up image data, the imaging control section 147 acquires the picked-up image data from the camera 61 and temporarily stores the picked-up image data in the storing section 122.

The operation control section 149 detects operation in the track pad 14 and the operation section 110 and outputs data corresponding to the detected operation. For example, when the button or the like of the operation section 110 is operated, the operation control section 149 generates operation data indicating operation content and outputs the operation data to the display control section 153. The display control section 153 changes a display state of the image display section 20 according to the operation data input from the operation control section 149.

When detecting operation in the track pad 14, the operation control section 149 acquires a coordinate of an operation position in the track pad 14. The operation control section 149 generates a track of the operation position. The track of the operation position is a track of the operation position that moves while touch operation of the track pad 14 is not released, that is, while a state in which a pointer is in contact with the track pad 14 continues.

The detection control section 151 detects a pointer associated with a motion (a movement) of the user from the picked-up image data of the camera 61. As the pointer, for example, a hand and fingers including an arm of the user (a hand and fingers are hereinafter collectively referred to as fingers) can be used. A member attached to the fingers or the arm of the user may be used as the pointer. For example, a finger ring worn on a finger of the user, a watch or a band worn on the arm of the user, and the like can be used as the pointer. Since these pointers are worn by the user, if the user moves the fingers or the arm, the pointers move integrally (together) according to the movement of the fingers or the arm. A preset tool such as a surgical operation tool (e.g., an electric knife) held by the user can also be used. The left hand of the user is equivalent to the "first pointer" and the right hand of the user is equivalent to the "second pointer".

The detection control section 151 acquires picked-up image data from the storing section 122 and detects a region of a hand and fingers of the user imaged in the acquired picked-up image data (hereinafter referred to as finger region). The detection control section 151 specifies a shape and a position of the fingers appearing in the detected finger region, compares the specified shape and the specified position of the fingers with the information registered in the pattern registration dictionary 125, and detects a gesture or a hand sign.

Specifically, the detection control section 151 detects, from the acquired picked-up image data, a region where the fingers of the user are imaged. For example, the detection control section 151 extracts a skin color region from the region of the picked-up image data according to skin color extraction processing. The detection control section 151 compares a pixel value of the extracted skin color region with a threshold and detects a finger region according to threshold processing. The detection control section 151 extracts a contour of the detected finger region according to edge detection processing and detects a shape and a position of the fingers using feature point matching or curvature determination by unevenness of the contour. The detection control section 151 detects a shape and a position of the fingers from respective continuously picked-up image data and detects a change in the shape and the position, that is, a movement of the fingers. When detecting the shape and the position of the fingers, the detection control section 151 compares the detected shape and the detected position of the fingers with the information registered in the pattern registration dictionary 125 and detects a gesture or a hand sign.

The display control section 153 generates a control signal for controlling the right display unit 22 and the left display unit 24 and controls the right display unit 22 and the left display unit 24 with the generated control signal. Specifically, the display control section 153 controls the OLED driving circuits 225 and 245 to execute display of an image by the OLED panels 223 and 243. The display control section 153 performs, on the basis of a signal output by the image processing section 145, control of timing when the OLED driving circuits 225 and 245 perform drawing on the OLED panels 223 and 243, control of luminance of the OLED panels 223 and 243, and the like.

The display control section 153 causes the image display section 20 to display, in a display region 310 explained below, a candidate of input content corresponding to at least any one of the movement, the shape, and the position of the fingers detected by the detection control section 151. The display control section 153 compares the movement, the shape, and the position of the fingers detected by the detection control section 151 with the information for specifying a gesture or a hand sign registered in the pattern registration dictionary 125 and selects a gesture or a hand sign, at least a part of which coincides with the information. The display control section 153 causes the image display section 20 to display, as a candidate of input content, an image of a character indicated by character information associated with the selected gesture or hand sign.

The candidate of the input content, which the display control section 153 causes the image display section 20 to display, is not limited to a character and a sign. For example, it is assumed that the display control section 153 causes the image display section 20 to display an image of a software keyboard in the display region 310 and the detection control section 151 detects a position of the fingers from the picked-up image data and detects a selected key. In this case, the display control section 153 may display, as the candidate of the input content, a key displayed in the position of the fingers detected by the detection control section 151.

The HMD 100 may include an interface (not shown in the figure) that connects various external devices functioning as supply sources of contents. The interface may be an interface adapted to wired connection such as a USB interface, a micro USB interface, or an interface for a memory card or may be configured by a wireless communication interface. An external device in this case is an image supply device that supplies an image to the HMD 100. A personal computer (PC), a cellular phone terminal, a portable game machine, or the like is used. In this case, the HMD 100 can output an image and sound based on content data input from the external devices.

Figure 6:
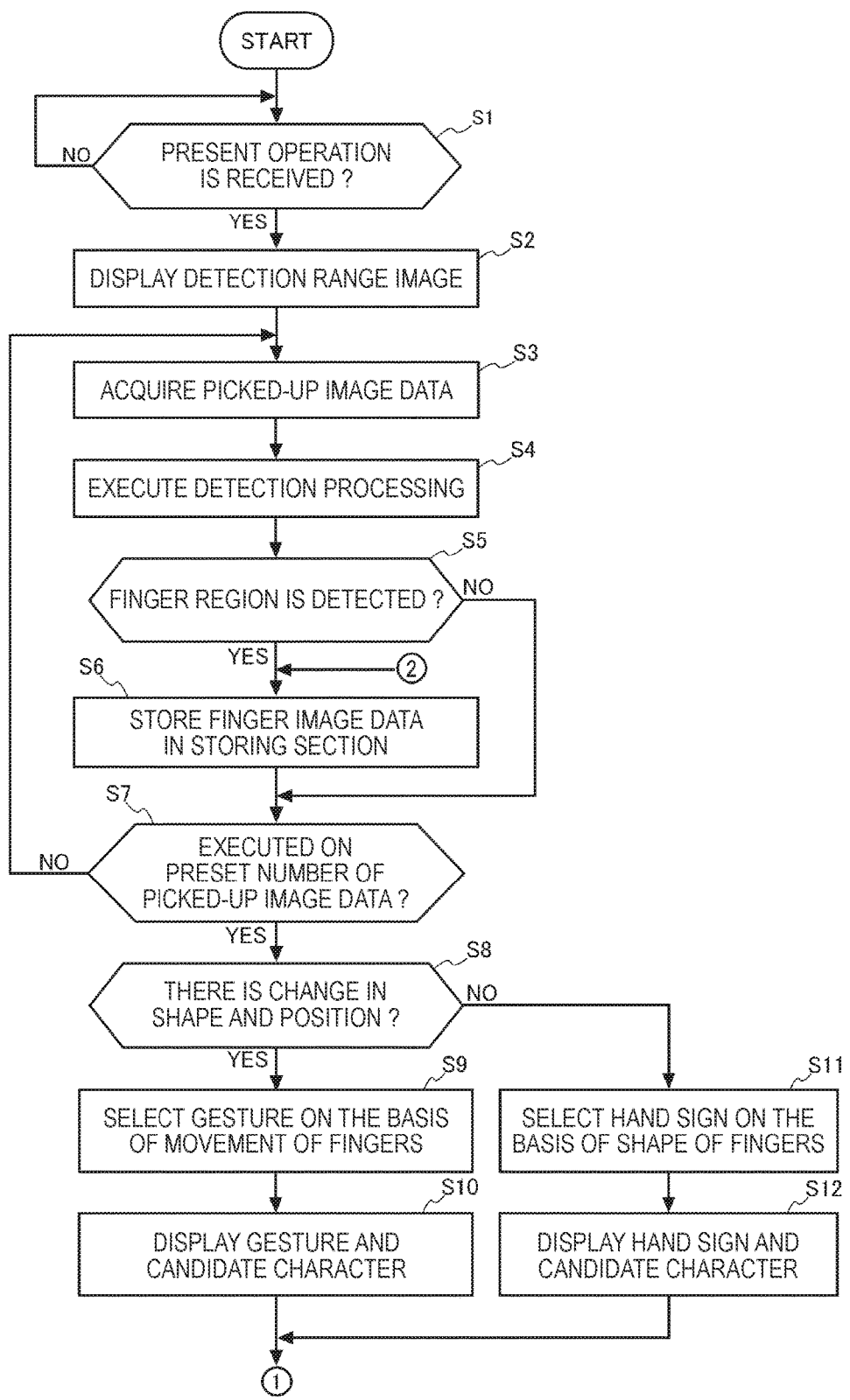
FIG. 6 is a flowchart for explaining the operation of a control section.

FIG. 6 is a flowchart for explaining the operation of the control section 150. In particular, FIG. 6 is a flowchart for explaining operation for detecting a gesture or a hand sign of the user and inputting a character or a sign corresponding to the detected gesture or hand sign.

First, the control section 150 determines whether preset operation is received (step S1). The preset operation includes, for example, operation of the button 11, the up/down key 15, and the track pad 14.

The control section 150 may detect a movement of the head of the user with the six-axis sensor 235 mounted on the image display section 20 and, when a preset movement of the head is detected, determine that the preset operation is received. For example, when detecting a movement of the head such as a nod or a head swing on the basis of a detection value of the six-axis sensor 235, the control section 150 may determine that the preset operation is received.

The control section 150 may detect a finger region of the user from picked-up image data picked up by imaging of the camera 61 and, when a preset gesture or hand sign is detected, determine that the preset operation is received.

The control section 150 may determine on the basis of a sound signal input from the microphone 63 whether the preset operation is received. The control section 150 compares the sound signal input from the microphone 63 with a sound pattern acquired from the sound pattern dictionary 126. When a sound signal coinciding with a finger snap or knock sound registered in the sound pattern dictionary 126 is input, the control section 150 may determine that the preset operation is received.

When determining that the preset operation is not received (NO in step S1), the control section 150 stays on standby until the preset operation is received. If there is other executable processing, the control section 150 executes the executable processing. When determining that the preset operation is received (YES in step S1), the control section 150 causes the image display section 20 to display a detection range image 320 in the display region 310 (step S2) and starts detection of fingers of the user functioning as a pointer. The detection range image 320 and the display region 310 are explained with reference to FIG. 7. The detection range image 320 is equivalent to the "image indicating a detection state" in the aspect of the invention and equivalent to the "image indicating a detection area" in the aspect of the invention.

Figure 7:
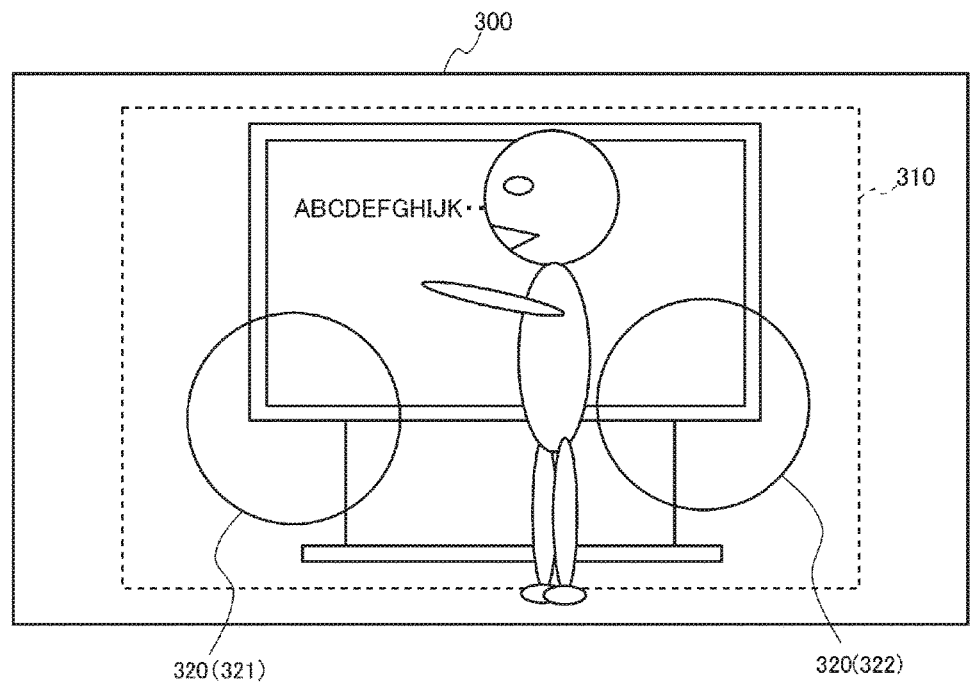
FIG. 7 is a diagram showing a field of vision of a user wearing the HMD.

FIG. 7 is a diagram showing an example of a field of vision 300 of the user wearing the HMD 100.

The HMD 100 makes the image light L of an image process in the inside and the external light OL incident on the eyes of the user to be superimposed one on top of the other. For this reason, an outside scene is visible to the user through the right light guide plate 26 and the left light guide plate 28. An image by the image light L is visually recognized over the outside scene. The outside scene is a scene visible to the eyes of the user via the image display section 20. In FIG. 7, a class scene in which a teacher is teaching using a blackboard is shown. That is, FIG. 7 shows the field of vision 300 of a student wearing the HMD 100.

The HMD 100 causes the image display section 20 to display an image based on the image light L (hereinafter referred to as display image) in the display region 310. The display region 310 indicates a range in which the HMD 100 is capable of displaying the display image. The user visually recognizes the display image displayed by the HMD 100 and an outside scene in the display region 310. The user visually recognizes only the outside scene on the outer side of the display region 310. Note that, in FIG. 7, a rectangular image indicating the display region 310 is shown for explanation. However, the user does not visually recognize the image indicating the display region 310.

In FIG. 7, a state is shown in which the detection range image 320 is displayed as the display image. The detection range image 320 is an image indicating a range in which the control section 150 detects fingers of the user. The control section 150 extracts data in a range corresponding to the detection range image 320 from picked-up image data of the camera 61 and detects a finger region from the extracted data of the range. By causing the image display section 20 to display the detection range image 320 in the display region 310, it is unnecessary to detect fingers from the entire display region 310. It is possible to reduce a detection time for the finger region. The detection range image 320 includes a left detection range image 321 indicating a detection range of fingers of the left hand of the user and a right detection range image 322 indicating a detection range of fingers of the right hand of the user.

When detecting the finger region from a range corresponding to the left detection range image 321 of the picked-up image data, the control section 150 determines that the detected finger region is fingers of the left hand of the user. When detecting the finger region from a range corresponding to the right detection range image 322 of the picked-up image data, the control section 150 determines that the detected finger region is fingers of the right hand of the user. The control section 150 does not need to determine whether the detected finger region is a finger region of the right hand or a finger region of the left hand. Therefore, it is possible to reduce a time required for recognition processing of fingers. It is possible to reduce an occurrence probability of misrecognition in which the left hand and the right hand are erroneously recognized.

When the detection range image 320 is displayed in the display region 310, the user performs, with fingers, a gesture or a hand sign corresponding to a character or a sign that the user desires to input. At this point, the user performs the gesture or the hand sign such that the left and right fingers are respectively displayed in the left detection range image 321 and the right detection range image 322.

The gesture or the hand sign performed by the user may be a gesture or a hand sign in which the left and right fingers each represent one character or sign or may be a gesture or a hand sign in which one character is represented by a combination of both the hands, for example, the left fingers indicate a vowel and the right fingers indicate a consonant.

Figure 8:
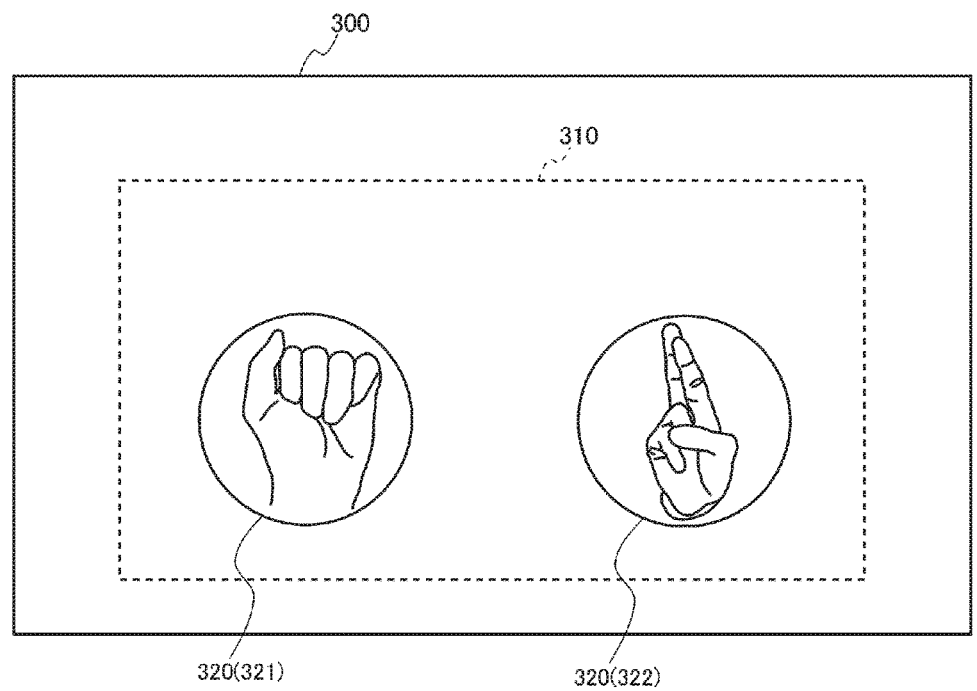
FIG. 8 is a diagram showing a state in which fingers of the user are displayed in left and right detection range images.

FIG. 8 is a diagram showing a state in which the left hand fits in a frame of the left detection range image 321 and the right hand fits in a frame of the right detection range image 322.

Subsequently, the control section 150 causes the camera 61 to execute imaging and acquires picked-up image data generated by the camera 61 (step S3). The control section 150 extracts a region corresponding to the detection range image 320 from the acquired picked-up image data. The control section 150 specifies a range corresponding to the detection range image 320 of the picked-up image data using parameters generated by calibration and extracts data in the specified range. The control device 10 executes, in advance, before the start of this processing flow, calibration for associating a position on the picked-up image data of the camera 61 and a position on the display region 310 where the image display section 20 displays an image. In this embodiment, the calibration is performed by a method explained below.

The control section 150 recognizes a reference real object corresponding to an image for calibration from the picked-up image data of the camera 61 and tracks the reference real object while causing the image display section 20 to display the image for calibration. In this state, the user moves a position of the image for calibration on the image display section 20 via a user interface such as the track pad 14. At timing when the user senses that the image for calibration and the reference real object overlap (at least one of positions, sizes, and directions thereof substantially coincide with each other), the user notifies the control section 150 to that effect via the user interface. The control section 150 acquires the notification and generates, according to the acquired notification, parameters for associating a detection result (a position on the picked-up image data) of the reference real object at the timing and a display position of the image for calibration on the image display section 20.

Subsequently, when extracting data in the range corresponding to the detection range image 320 from the picked-up image data, the control section 150 executes any publicly-known technique on the extracted data and executes detection processing for detecting a finger region (step S4). For example, the control section 150 extracts a skin color region from the extracted region of the picked-up image data according to skin color extraction processing and compares a pixel value of the extracted skin color region with a threshold and calculates a finger region according to threshold processing. The control section 150 extracts a contour of the calculated finger region according to edge detection processing and detects fingers using feature point matching or curvature determination by unevenness of the contour.

The control section 150 may calculate a difference among a continuous plurality of picked-up image data, specify a region including a movement (a moving region) on the basis of the calculated difference, and extract the specified moving region as a finger region. The control section 150 may detect a finger region using the same method as the method generally used for face detection such as Boosting or SVM (Support Vector Machine).

Subsequently, the control section 150 determines whether a finger region is detected by the detection processing (step S5). When a finger region is not detected (NO in step S5), the control section 150 shifts to processing in step S7. When a finger region is detected (YES in step S5), the control section 150 causes the storing section 122 to store picked-up image data of the detected finger region (hereinafter referred to as finger image data) (step S6).

The control section 150 determines whether the detection processing is executed on a preset number of picked-up image data (step S7). The preset number of picked-up image data may be continuously picked-up image data or may be picked-up image data extracted for each predetermined number of picked-up image data from the continuously picked-up image data. Note that picked-up image data for one frame image picked up by imaging of the camera 61 is represented as one picked-up image data. When the detection processing is not executed on the preset number of picked-up image data (NO in step S7), the control section 150 returns to step S3 and acquires picked-up image data from the storing section 122 anew. The control section 150 executes the detection processing on the acquired picked-up image data (step S4).

When the detection processing is executed on the preset number of picked-up image data (YES in step S7), the control section 150 acquires the finger image data that the control section 150 causes the storing section 122 to store in step S6. When there are a plurality of acquired finger image data, the control section 150 compares the finger image data and determines whether there is a change in a position or a shape of the fingers (step S8). For example, the control section 150 sets, as a start time of a gesture, a point in time when the fingers are detected in the detection range image 320 and sets, as an end time of the gesture, a point in time when the fingers are moved out from the detection range image 320 and determines whether there is a movement in the fingers between the start time and the end time. The control section 150 may set, as the start point of the gesture, a point in time when a movement of the finger is detected, and set, as the end time of the gesture, a point in time when the movement of the fingers stops and determine whether there is a movement in the fingers between the start time and the end time.

When it is determined that there is a change in the shape or the position of the fingers, that is, there is a movement in the fingers (YES in step S8), the control section 150 determines that operation performed by the user is a gesture. In this case, the control section 150 determines the gesture on the basis of a state of the fingers detected from the picked-up image data and the gesture registration dictionary 1251 and selects an input candidate character or sign (hereinafter collectively referred to as candidate character 335) corresponding to the determined gesture.

The control section 150 performs matching of the information for specifying a gesture registered in the gesture registration dictionary 1251 and the detected state of the fingers and selects a gesture in which a matching result satisfies a condition (step S9). For example, the control section 150 selects a gesture in which at least a part of states included in the detected movement of the fingers coincides with the information for specifying a gesture registered in the gesture registration dictionary 1251 (step S9). Either one or a plurality of gestures may be selected. The control section 150 causes the image display section 20 to display an image indicating the selected gesture in the candidate display region 330 and causes the image display section 20 to display a character associated with the gesture in the candidate display region 330 as the candidate character 335 (step S10). The candidate display region 330 is a region where the control section 150 causes the image display section 20 to display the candidate character 335 determined on the basis of the gesture registration dictionary 1251 and the hand sign registration dictionary 1252. The candidate display region 330 is displayed in the display region 310 to be associated with a position where the fingers of the user, which are the pointer, are visually recognized. The candidate display region 330 is equivalent to the "image indicating a detection state" in the aspect of the invention and is equivalent to the "candidate display area" in the aspect of the invention.

When determining that there is no change in the position or the shape of the fingers, that is, there is no movement in the fingers (NO in step S8), the control section 150 selects the candidate character 335 referring to the hand sign registration dictionary 1252. The control section 150 compares the detected shape and the detected position of the fingers with the information for specifying a hand sign and selects a hand sign, at least a part of which coincides with the detected shape and the detected position of the fingers (step S11). Either one or a plurality of hand signs may be selected. When selecting the hand sign, the control section 150 causes the image display section 20 to display, in the candidate display region 330, an image indicating the selected hand sign and the candidate character 335 associated with the hand sign (step S12).

When determining that the shape of the fingers is continuously the same shape for a preset time or more, the control section 150 may determine a hand sign on the basis of the detected shape and the detected position of the fingers and cause the image display section 20 to display a candidate. By selecting a hand sign when the same shape of the fingers is continuously detected for the preset time or more, it is possible to increase a probability that the candidate character 335 intended by the user is displayed in the candidate display region 330.

When determining that the fingers are in a state in which the fingers continuously stand still for a predetermined time or more, the control section 150 may detect a shape and a position of the fingers, refer to the hand sign registration dictionary 1252 on the basis of the detected shape and the detected position of the fingers, and determine a hand sign. The state in which the fingers continuously stand still for the predetermined or more is equivalent to "when the pointer corresponds to a preset condition" in the aspect of the invention.

The control section 150 may cause the image display section 20 to display a predetermined symbol or the like in the display region 310 and, when the fingers pass a display position of the symbol or when the fingers overlap the display position of the symbol, perform detection of a hand sign. For example, timing when the control section 150 detects a hand sign may be time when the position of the fingers of the user overlaps the display position of the symbol or may be timing when a movement of the fingers comes to a standstill after passing the display position of the symbol. "When the fingers pass the display position of the symbol" is equivalent to "when the position of the pointer overlaps a preset position" in the aspect of the invention.

Figure 9:
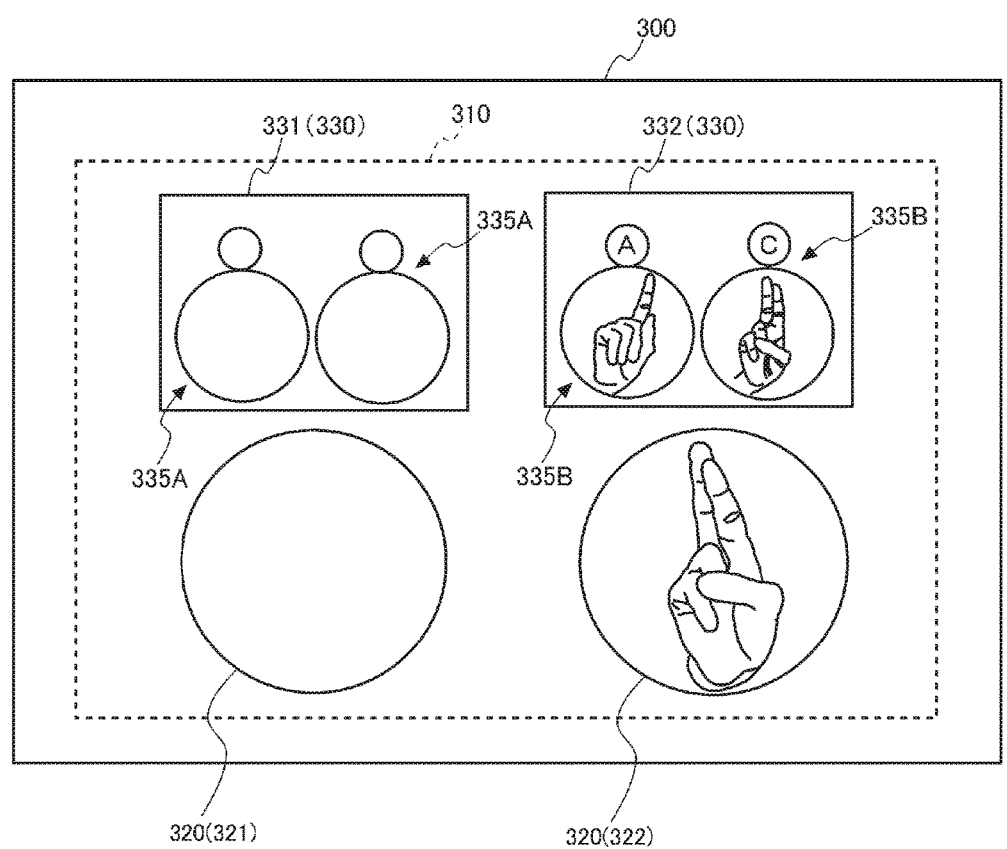
FIG. 9 is a diagram showing a display example of a candidate display region.

FIG. 9 is a diagram showing the candidate display region 330.

The candidate display region 330 is displayed in a position corresponding to the detection range region 320 or a position corresponding to fingers detected in the detection range image 320. The candidate display region 330 includes a left candidate display region 331 and a right candidate display region 332. The left candidate display region 331 and the right candidate display region 332 are equivalent to the "candidate display area" in the aspect of the invention. The left candidate display region 331 is displayed in a position corresponding to the left detection range image 321 or a position corresponding to fingers detected in the left detection range image 321. The right candidate display region 332 is displayed in a position corresponding to the right detection range image 322 or a position corresponding to fingers detected in the right detection range image 322. In the left candidate display region 331, the candidate character 335 determined on the basis of a shape, a position, and a movement of the left hand detected from the picked-up image data by the control section 150 (hereinafter referred to as left candidate character 335A) is displayed. In the right candidate display region 332, the candidate character 335 determined on the basis of a shape, a position, and a movement of the right hand detected from the picked-up image data by the control section 150 (hereinafter referred to as right candidate character 335B) is displayed. The left candidate character 335A and the right candidate character 335B are collectively referred to as candidate character 335.

FIG. 9 shows a display example in which the left candidate display region 331 is displayed in the periphery of the left detection range image 321 and the right candidate display region 332 is displayed in the periphery of the right detection range image 322.

The periphery of the left detection range image 321 is the vicinity of the left detection range image 321 and is a range in which the user can recognize that the left candidate display region 331 and the left detection range image 321 are associated. The control section 150 may display the left candidate display region 331 in the periphery of the left detection range image 321 on the basis of a distance set beforehand by the user. The same applies to the distance between the right candidate display region 332 and the right detection range image 322.

Display positions of the left candidate display region 331 and the right candidate display region 332 are not limited to the example shown in FIG. 9. For example, the left candidate display region 331 may be displayed in contact with the left detection range image 321. The right candidate display region 332 may be displayed in contact with the right detection range image 322.

The left candidate display region 331 may be displayed such that at least a part of the left candidate display region 331 overlaps the left detection range image 321. The right candidate display region 332 may be displayed such that at least a part of the right candidate display region 332 overlaps the right detection range image 322. A position corresponding to the detected fingers where the left candidate display region 331 and the right candidate display region 332 are displayed may be, for example, a position of a tip of a preset finger such as an index finger among the fingers of the user. By displaying the candidate display region 330 in the vicinity of the detection range image 320 in this way, the user can select the candidate character 335 displayed in the vicinity of the fingers without moving a line of sight.

The operation of the character input by gesture or hand sign detection is continuously explained with reference to a flowchart of FIG. 10.

Subsequently, the control section 150 detects a motion for selecting the left candidate character 335A displayed in the left candidate display region 331 and a motion for selecting the right candidate character 335B displayed in the right detection range image 322. The control section 150 causes the camera 61 to execute imaging and acquires picked-up image data generated by the camera 61 (step S13). The control section 150 specifies a range of picked-up image data of the candidate display region 330 using the parameters generated by the calibration, executes any publicly-known technique on the picked-up image data in the specified range, and executes detection processing for detecting a finger region. After executing the detection processing, the control section 150 determines whether a finger region is detected from the picked-up image data (step S14). When a finger region cannot be detected (NO in step S14), the control section 150 returns to step S13, acquires picked-up image data (step S13), and executes the detection processing again.

When a finger region is detected (YES in step S14), the control section 150 specifies the selected candidate character 335 on the basis of a region of the picked-up image data where the finger region is detected. The control section 150 detects finger regions respectively concerning the left candidate display region 331 and the right candidate display region 332. When a finger region is detected in the left candidate display region 331, the control section 150 determines, as the left candidate character 335A, the candidate character 335 displayed in a range of the picked-up image data in which the finger region is detected (step S15). When a finger region is detected in the right candidate display region 332, the control section 150 determines, as the right candidate character 335B, the candidate character 335 displayed in a range of the picked-up image data in which the finger region is detected (step S15). The control section 150 causes the storing section 122 to store, as selected character, the candidate character 335 determined as being selected (step S16).

Subsequently, the control section 150 acquires picked-up image data of the camera 61 (step S17), executes the detection processing on a region of the picked-up image data corresponding to the detection range image 320 (step S18), and detects a finger region. When a finger region is detected (YES in step S19), the control section 150 returns to step S6 shown in FIG. 6 and causes the storing section 122 to store finger image data. Thereafter, the control section 150 repeats the processing in step S7 and subsequent steps. When a finger region is not detected (NO in step S19), the control section 150 determines whether a predetermined time has elapsed from the last detection of a finger region (step S20). When the predetermined time has not elapsed from the last detection of a finger region (NO in step S20), the control section 150 returns to step S17, acquires picked-up image data, and executes the detection processing (step S17).

When the predetermined time has elapsed from the last detection of a finger region (YES in step S20), the control section 150 reads out the selected character from the storing section 122. The selected character read out from the storing section 122 by the control section 150 is one character in some case and is a plurality of characters, that is, a character string in other cases. After reading out the selected character, the control section 150 executes processing corresponding to the read-out selected character on the basis of the read-out selected character (step S21). For example, when a Web browser is started as an application program, the control section 150 inputs the selected character to a search field of the Web browser. When a mail application is started, the control section 150 inputs the selected character to, for example, a destination or a text of a mail.

In the flowchart, in step S15, the control section 150 determines, as the selected character, the candidate character 335 displayed in the region of the candidate display region 330 where the finger region is detected.

As another operation, for example, the control section 150 may add numbers respectively to a plurality of candidate characters 335 and cause the image display section 20 to display the numbers in the candidate display region 330 together with the candidate characters 335. The user forms, in the detection range image 320, a finger character of a number corresponding to the candidate character 335 to be selected. The control section 150 specifies a shape of the fingers on the basis of the picked-up image data and determines the selected candidate character 335. The user may perform a gesture corresponding to the number added to the candidate character 335 to be selected and select the candidate character 335.

In FIG. 7, the left detection range image 321 and the right detection range image 322 are shown as the detection range images 320. However, one detection range image 320 may be displayed in the display region 310. In this case, the control section 150 detects finger regions of both the hands of the user from a range corresponding to the detection range image 320 of the picked-up image data.

In FIG. 7, circular images are shown as the left detection range image 321 and the right detection range image 322. However, the shape of the detection range image 320 is not limited to the circular shape. For example, the detection range image 320 may be a rectangular image or may be a polygonal image.

A size of the detection range image 320 is set in advance to be larger than a size of the fingers of the user appearing in the picked-up image data picked up by imaging of the camera 61.

Timing when the left detection range image 321 and the right detection range image 322 are displayed in the display region 310 may be timing when an image of a hand (the left hand, the right hand, or both the hands) of the user is detected from the picked-up image data. When fingers (the left hand, the right hand, or both the hands) of the user are detected from the picked-up image data of the camera 61, the control section 150 causes the image display section 20 to display, in the display region 310, at least one of the left detection range image 321 and the right detection range image 322 corresponding to the detected fingers. That is, when the left hand of the user is detected, the control section 150 causes the image display section 20 to display the left detection range image 321 such that the fingers of the detected left hand are included in a range of the left detection range image 321. Similarly, when the right hand of the user is detected, the control section 150 causes the image display section 20 to display the right detection range image 322 such that the fingers of the detected right hand are included in a range of the right detection range image 322.

The control section 150 may track a movement of the detected fingers and change display positions and display ranges of the left detection range image 321 and the right detection range image 322 according to the movement of the fingers.

The control section 150 detects fingers from picked-up image data sequentially imaged by the camera 61. When a change occurs in the position of the detected fingers, the control section 150 changes a display position and a display range of the left detection range image 321 or the right detection range image 322 corresponding to the fingers, in the position of which the change occurs.

That is, when determining that a change occurs in the position of the left hand of the user, the control section 150 causes the left detection range image 321 to follow the change in the position of the left hand and changes the display position of the left detection range image 321 such that the left hand is included in the range of the left detection range image 321. The control section 150 may change the display range of the left detection range image 321 according to the change in the position of the left hand.

When determining that a change occurs in the position of the right hand of the user, the control section 150 causes the right detection range image 322 to follow the change in the position of the right hand and changes the display position of the right detection range image 322 such that the right hand is included in the range of the right detection range image 322. The control section 150 may change the display range of the right detection range image 322 according to the change in the position of the right hand.

Since the control section 150 causes the left detection range image 321 and the right detection range image 322 to follow the movement of the fingers of the user, the user does not need to perform a gesture or a hand sign in a fixed position and can more freely perform the gesture or the hand sign.

Figure 11:
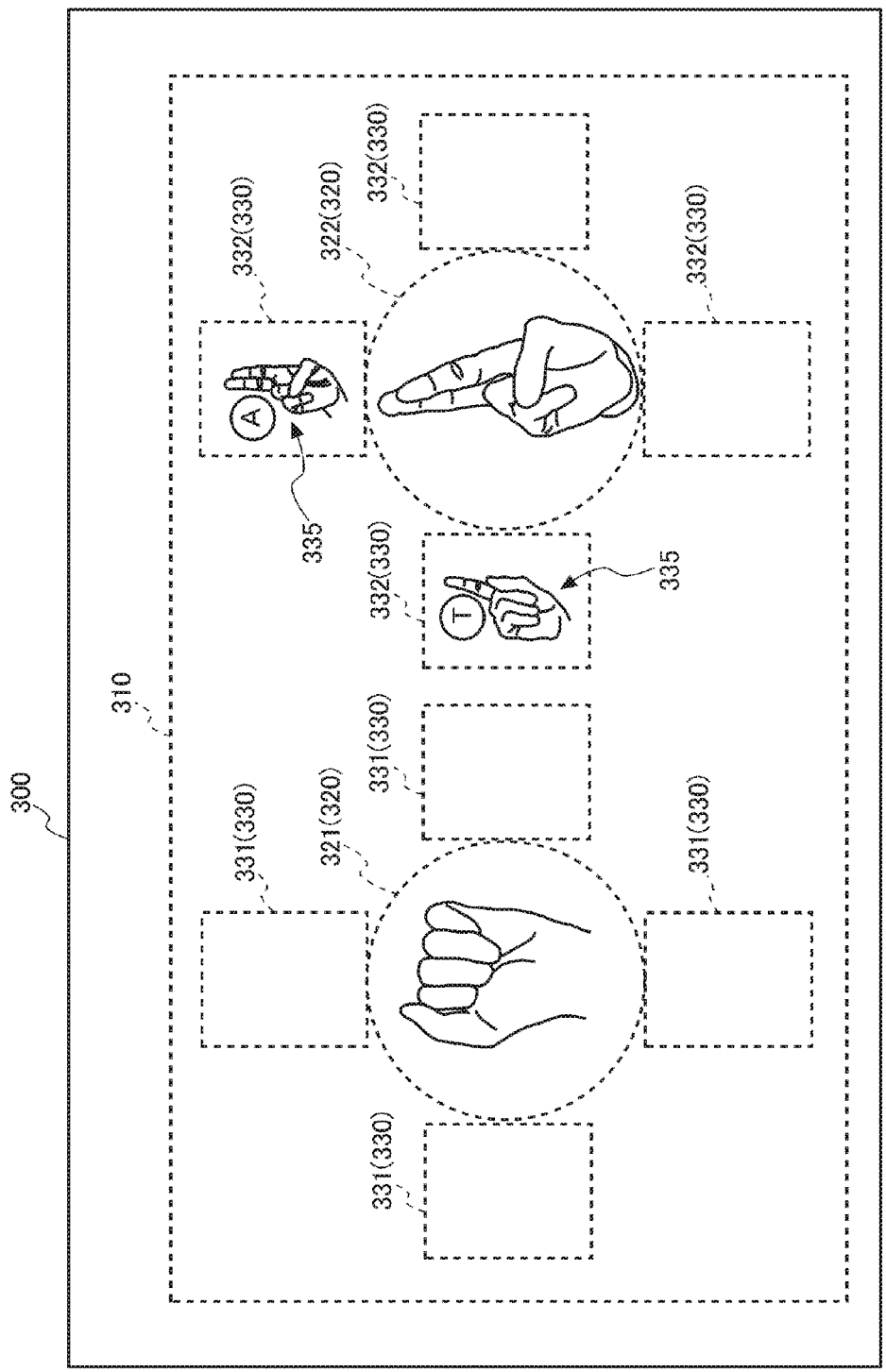
FIG. 11 is a diagram showing another display example of the candidate display region.

FIG. 11 is a diagram showing another display example of the candidate display region 330.

In FIG. 11, an example is shown in which left candidate display regions 331 are respectively displayed in directions corresponding to the upward, downward, left, and right four directions of the left detection range image 321 and right candidate display regions 332 are respectively displayed in directions corresponding to the upward, downward, left, and right four directions of the right detection range image 322.

The user moves fingers in the direction of the candidate display region 330 where the candidate character 335 that the user desires to input is displayed. The control section 150 acquires picked-up image data of the camera 61 and detects a finger region from regions of the picked-up image data corresponding to upward, downward, left, and right candidate display regions 330 according to the method explained above. When a finger region is detected, the control section 150 determines that the candidate character 335 displayed in the candidate display region 330 where the finger region is detected is selected. The user only has to move the fingers in a direction in which a character that the user desires to input is displayed. Therefore, the user can easily perform selection of the candidate character 335.

In FIG. 11, the candidate display regions 330 are displayed in the upward, downward, left, and right four directions of the detection range image 320. However, directions in which the candidate display regions 330 are displayed may be changed according to the number of the candidate characters 335 to be selected. For example, when two characters are selected as the candidate characters 335, the candidate display regions 330 can be displayed in the up-down direction or the left-right direction of the detection range image 320.

The control section 150 may cause the storing section 122 to store the candidate character 335 and a selected character actually selected by the user in association with each other. When the candidate character 335 determined on the basis of a gesture or a hand sign of the user is the candidate character 335 that the control section 150 causes the storing section 122 to store, the control section 150 causes the image display section 20 to display a selected character associated with the candidate character 335 in the display region 310. By causing the storing section 122 to store the candidate character 335 and the selected character in association with each other in this way, it is possible to improve recognition accuracy of a gesture and a hand sign. Even if there is a peculiarity in shapes of the hand and the fingers formed by the user, it is possible to cause the image display section 20 to display, in the candidate display region 330, a candidate of a character or a sign intended by the user.

Figure 12:
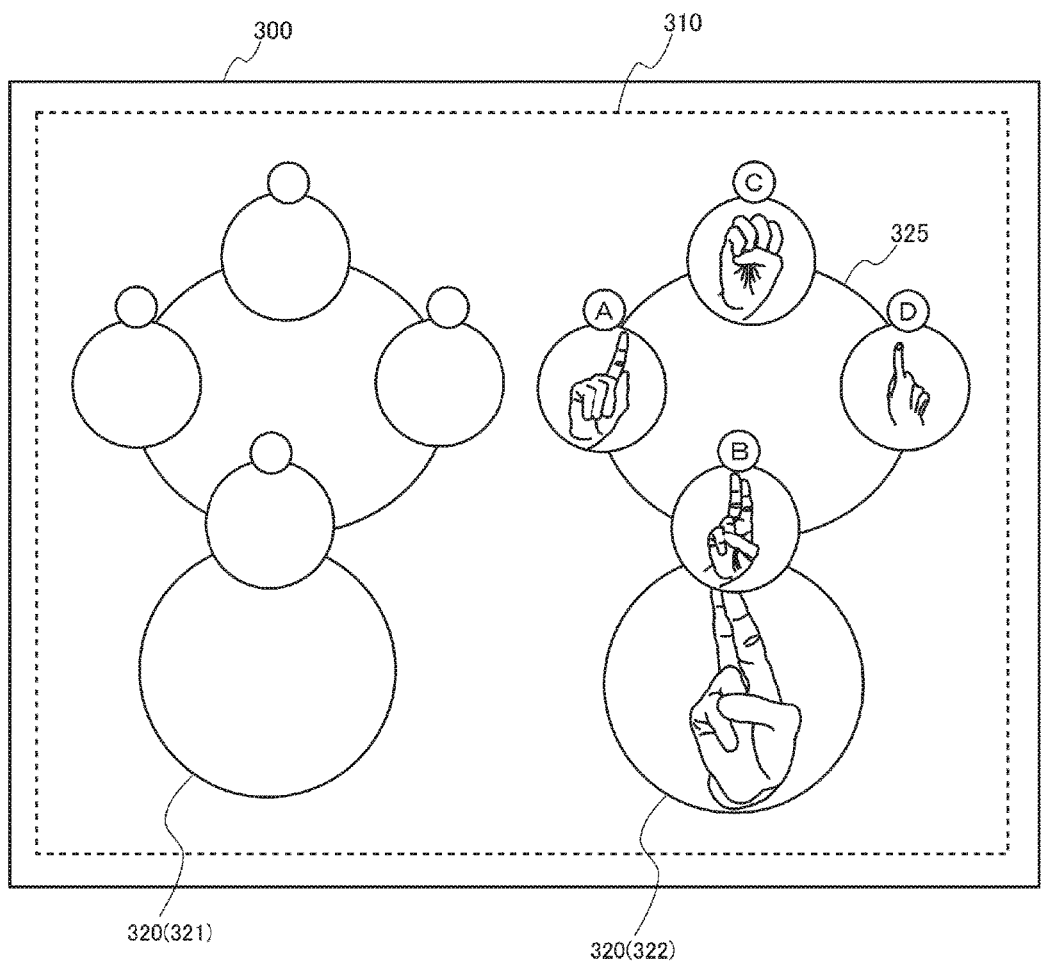
FIG. 12 is a diagram showing another display example of the candidate display region.

FIG. 12 is a diagram showing another display example of the candidate character 335.

In a display example shown in FIG. 12, a plurality of candidate characters 335 serving as candidates and hand signs indicating the plurality of candidate characters 335 are displayed in the circumferential direction of an image indicating a ring (hereinafter referred to as ring image 325). In the display example shown in FIG. 12, the candidate characters 335 are respectively displayed in positions corresponding to the upward, downward, left, and right four directions of the ring image 325.

When selecting one candidate character 335 out of the plurality of candidate characters 335, the user performs, for example, a motion explained below.

For example, when selecting the right candidate character 335B of the right hand, the user performs a gesture for moving the right hand from the left to the right or from the right to the left and moves the right candidate character 335B, which the user desires to select, to a selection position. The selection position is a preset position and may be a position corresponding to any one of the upward, downward, left, and right four directions of the ring image 325. In this embodiment, a position corresponding to the downward direction of the ring image 325 is the selection position. In FIG. 12, a position indicated by "B" as the right candidate character 335B corresponds to the selection position.

The control section 150 detects a movement of the right hand according to picked-up image data of the camera 61, rotates the ring image 325 in a direction in which the right hand moves, and also rotates the plurality of candidate characters 335 according to the rotation of the ring image 325.

When the candidate character 335 is displayed in the selection position, the user performs preset deciding operation and decides the candidate character 335. The deciding operation may be, for example, a nodding motion, that is, a motion for tilting the head of the user to the forward direction, which is aline of sight direction of the user. The control section 150 detects a movement of the head of the user on the basis of a detection value of the six-axis sensor 235 and determines whether the deciding operation is input. For example, the user may utter voice "decide". The control section 150 determines on the basis of a sound signal input from the microphone 63 whether the user utters "decide".

When selecting one candidate character 335 out of the plurality of candidate characters 335, the user may select the candidate character 335 by superimposing a finger on a position where the candidate character 335 to be selected is displayed. That is, when selecting the right candidate character 335B, the user superimposes the right hand on the position of the right candidate character 335B to be selected. When selecting the left candidate character 335A, the user superimposes the left hand on the position of the left candidate character 335A to be selected.

In the explanation of the flowchart of FIG. 6, when receiving the preset operation, the control section 150 causes the image display section 20 to display the left detection range image 321 and the right detection range image 322 in the display region 310. When executing a preset computer program as another operation, the control section 150 may cause the image display section 20 to display the left detection range image 321 and the right detection range image 322 in the display region. The preset computer program is an application program (hereinafter referred to as application) requiring a character input such as browser software or word processor software.

Figure 13:
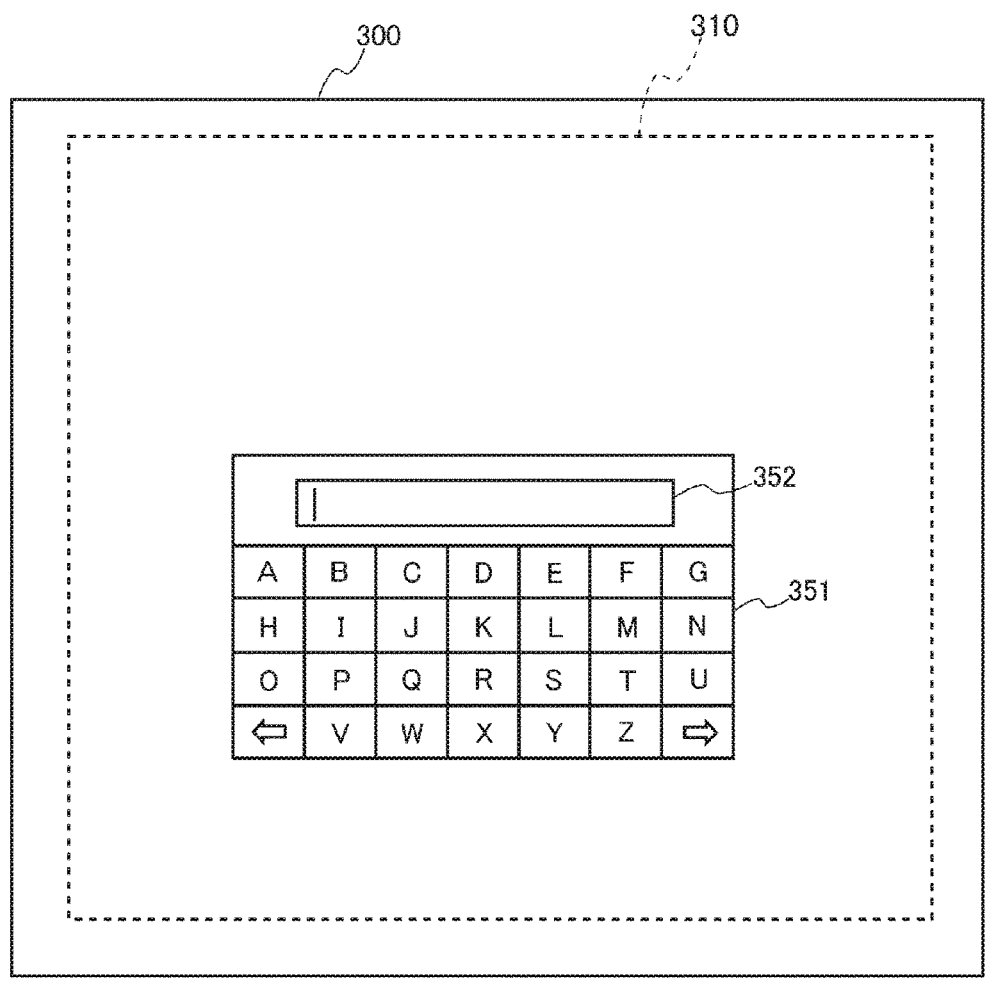
FIG. 13 is a diagram showing a software keyboard and a character input field displayed in a display region.

FIG. 13 is a diagram showing a software keyboard 351 and a text input field 352 displayed in the display region 310.

When executing an application requiring a character input, the control section 150 causes the image display section 20 to display the software keyboard or the left detection range image 321 and the right detection range image 322 in the display region 310 according to the setting data 123. When a finger of the user is detected in a position corresponding to the text input field 352, the control section 150 may cause the image display section 20 to display the software keyboard or the left detection range image 321 and the right detection range image 322 in the display region 310 according to the setting data 123. After causing the image display section 20 to display the left detection range image 321 and the right detection range image 322 in the display region 310, the control section 150 shifts to a state for detecting a pointer and starts detection of fingers of the user. A state in which the application requiring a character input is selected by the user and the control section 150 starts execution of the selected application is equivalent to "when preset operation is detected" in the aspect of the invention. "When a finger of the user is detected in a position corresponding to the text input field 352" is also equivalent to "when preset operation is selected" in the aspect of the invention.

The setting data 123 stored by the storing section 122 includes information for setting whether a character input is performed by the software keyboard 351 or a character input by a gesture or a hand sign is performed when an application requiring a character input is executed.

The setting data 123 can be rewritten by, for example, operation of the operation section 110. The setting data 123 is changed for the control section 150 according to the operation received by the operation section 110. When the setting data 123 is changed, the character input is changed from the software keyboard to a gesture or a hand sign or changed from a gesture or a hand sign to the software keyboard.

It may be set for each of application requiring a character input whether the character input is performed by the software keyboard or performed by a gesture or a hand sign. That is, the setting data 123 is generated for each of the applications requiring a character input. When an execution instruction for an application is input, the control section 150 causes, according to the setting data 123 corresponding to the application, the image display section 20 to display the software keyboard 351 or the left detection range image 321, and the right detection range image 322 in the display region 310.

In the embodiment, the input of the character by a gesture or a hand sign is explained. However, the input by a gesture or a hand sign is not limited to only the character. For example, it is also possible to operate a function of the HMD 100 with a gesture or a hand sign or operate an external device connected to the HMD 100 with a gesture or a hand sign.

Operation of the audio function of the HMD 100 by a gesture or a hand sign is explained.

For example, a gesture and a hand sign of the left hand of the user are associated with operation for selecting setting items such as volume control and music selection. A gesture and a hand sign of the right hand are associated with operation for setting a selected setting item.

In this case, in the gesture registration dictionary 1251, as information concerning the left hand, information for specifying a gesture of the left hand and information indicating setting items (e.g., volume control and music selection) associated with gestures are registered in association with each other.

In the gesture registration dictionary 1251, as information concerning the right hand, information for specifying a gesture of the right hand and information indicating an operation item associated with the gesture are registered for each of the setting items. The hand sign registration dictionary 1252 has a similar configuration. For example, when a setting item is volume control, the information concerning the right hand includes information for specifying a gesture and an operation item (e.g., volume-up, volume-down, or mute) associated with the gesture. When a setting item is music selection, as the information concerning the right hand, information for specifying a gesture and an operation item (e.g., play, pause, and stop) associated with the gesture are stored in the gesture registration dictionary 1251 as information concerning the volume control.

Figure 14:
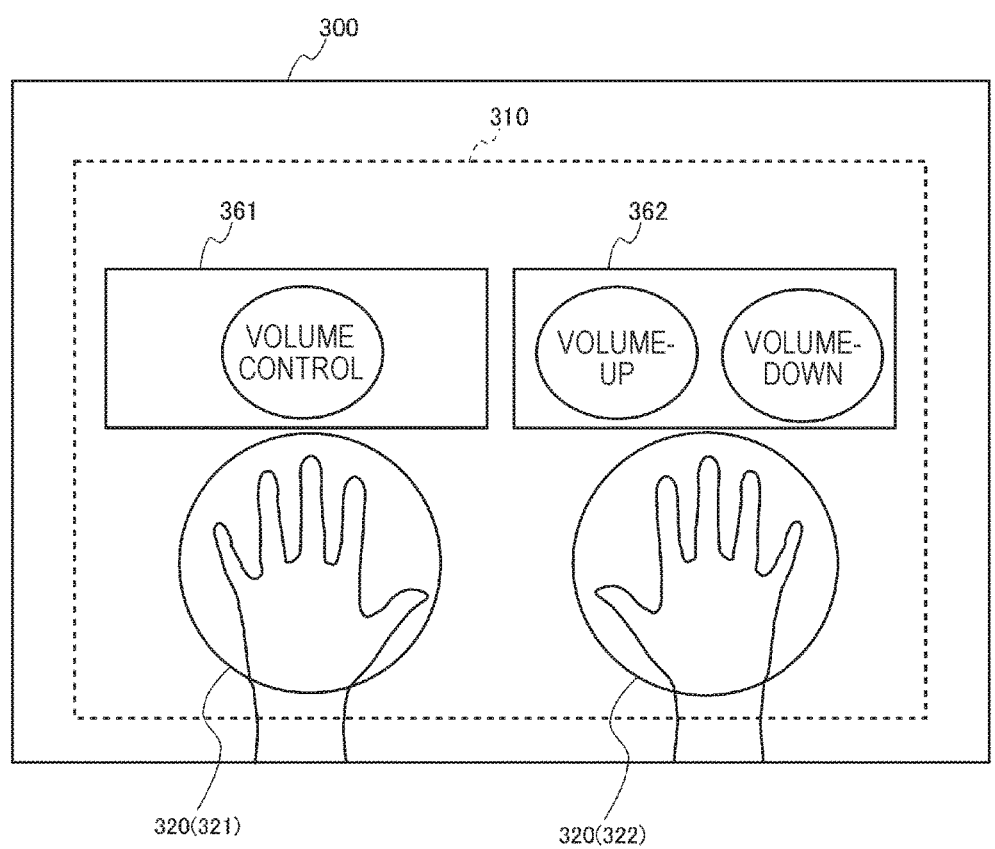
FIG. 14 is a diagram showing a display image displayed when a function of the HMD is operated by a gesture or a hand sign.

FIG. 14 is a diagram showing a display image displayed on the display region 310 when a function of the HMD 100 is operated by a gesture or a hand sign. In particular, FIG. 14 is a diagram showing a display image displayed in the display region 310 when the audio function of the HMD 100 is operated.

First, the control section 150 detects a gesture or a hand sign of the left hand on the basis of picked-up image data of the camera 61. When a gesture or a hand sign of the left hand is detected, the control section 150 causes the image display section 20 to display, in a left display region 361, a setting item corresponding to the detected gesture or hand sign of the left hand. In FIG. 14, a state is shown in which volume control is displayed in the left display region 361 as a setting item. The setting item displayed in the left display region 361 is equivalent to the "first operation image" in the aspect of the invention.

Subsequently, the control section 150 detects deciding operation or cancelling operation. The deciding operation is operation for deciding the setting item displayed in the left display region 361. The cancelling operation is operation for cancelling the setting item displayed in the left display region 361. When the deciding operation is detected, the control section 150 detects a gesture or a hand sign of the right hand on the basis of the picked-up image data.

When the cancelling operation is detected, the control section 150 erases the display of the setting item displayed in the left display region 361 and detects a gesture or a hand sign of the left hand again.

The deciding operation and the cancelling operation may be, for example, operation by a gesture or a hand sign of the left hand or may be a movement of the head detected by the six-axis sensor 235.

When the deciding operation is detected, the control section 150 detects a gesture or a hand sign of the right hand on the basis of the picked-up image data. The control section 150 causes the image display section 20 to display, in a right display region 362, an operation item corresponding to the detected gesture or hand sign. In FIG. 14, a state is shown in which volume-down is displayed in the right display region 362 as an operation item. The operation item displayed in the right display region 362 is equivalent to the "second operation image" in the aspect of the invention.

Thereafter, as in the case of the gesture or the hand sign of the left hand, the control section 150 detects deciding operation or cancelling operation. When the deciding operation is detected, the control section 150 executes processing corresponding to an operation item displayed in the right display region 362. When the cancelling operation is detected, the control section 150 erases the display of the operation item displayed in the right display region 362 and detects a gesture or a hand sign of the right hand again.

When determining a setting item corresponding to the gesture or the hand sign of the left hand, the control section 150 may cause the image display section 20 to display, in the right display region 362, all of operation items of the right hand associated with the determined setting item.

For example, when determining that volume control is selected as the setting item, the control section 150 causes the image display section 20 to display volume-up, volume-down, and mute in the right display region 362. The user moves the right hand to overlap a position where an operation item that the user desires to operate is displayed. The control section 150 detects the position of the right hand on the basis of the picked-up image data and determines an operation item displayed in the detected position. The control section 150 executes processing corresponding to the determined operation item.

Figure 15:
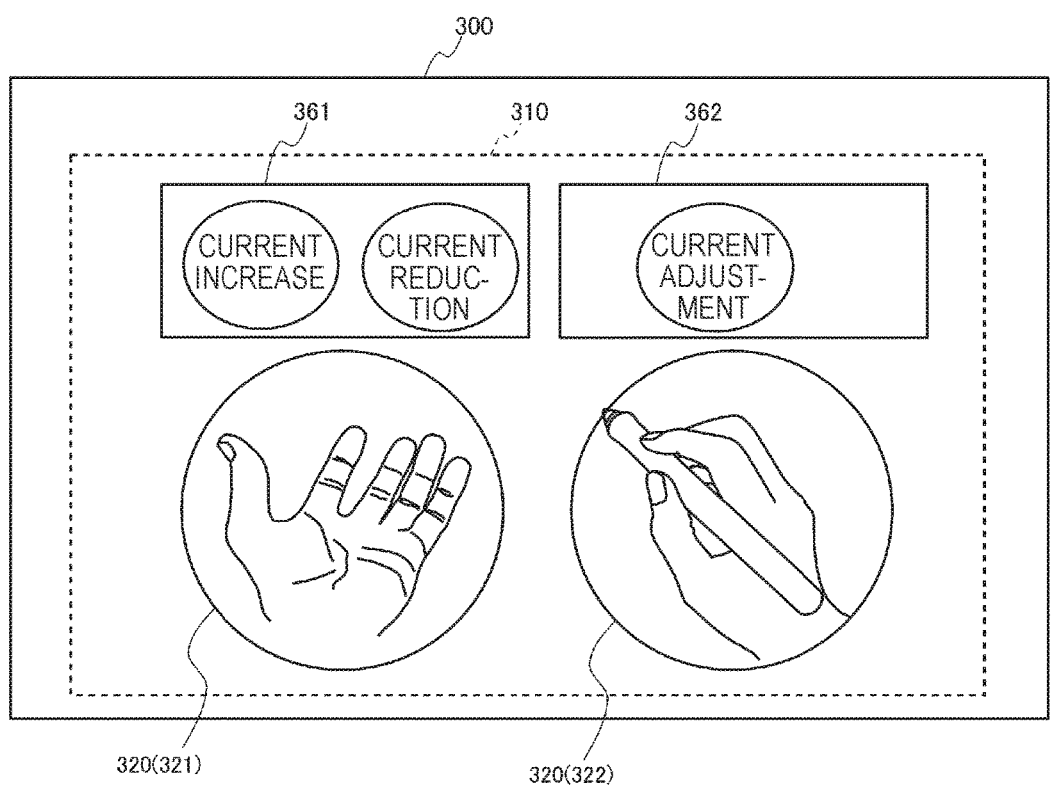
FIG. 15 is a diagram showing a display image displayed when an external device is operated by a gesture or a hand sign.

FIG. 15 is a diagram showing a display image displayed in the display region 310 when an external device connected to the HMD 100 is operated by a gesture or a hand sign. In particular, FIG. 15 is a diagram showing a display image displayed when an electric knife functioning as an external device is operated by a gesture or a hand sign.

The HMD 100 is connected to a control device (not shown in the figure) that controls, via the communication section 117, an electric current flowing to the electric knife. The control device and the HMD 100 may be connected by radio or may be connected by a wired cable.

First, the control section 150 detects a predetermined mark from picked-up image data of the camera 61. A predetermined mark such as a barcode or a QR cord (registered trademark) for specifying the external device such as the electric knife is stuck to the external device. The control section 150 detects the predetermined mark from the picked-up image data and specifies the external device gripped by a hand (assumed to be the right hand) of the user.

After detecting the predetermined mark of the picked-up image data and specifying the external device, the control section 150 causes the image display section 20 to display a setting item of the specified external device in the right display region 362.

A gesture and a hand sign of the right hand of the user are associated with operation for selecting setting items such as a switch and current adjustment.

In this case, in the gesture registration dictionary 1251, as information concerning the right hand, information for specifying a gesture of the right hand and information indicating setting items (e.g., a power switch and current adjustment) associated with gestures are registered in association with each other.

In the gesture registration dictionary 1251, as information concerning the left hand, information for specifying a gesture of the left hand and information indicating an operation item associated with the gesture are registered for each of the setting items. The hand sign registration dictionary 1252 has the same configuration. For example, when a setting item is current adjustment, as the information concerning the left hand, information for specifying a gesture and operation items (e.g., current increase and current reduction) associated with the gesture are stored in the gesture registration dictionary 1251 as information concerning the current adjustment.

After detecting the predetermined mark and specifying the external device gripped by the right hand of the user, the control section 150 causes the image display section 20 to display a setting item of the specified external device in the right display region 362.

When the setting item is displayed in the right display region 362, the user selects, with operation of the right hand or operation of the head, any one of the setting items displayed in the right display region 362. The operation of the right hand is operation for superimposing the right hand on a position where the setting item to be selected is displayed. The operation of the head is, for example, operation for turning the head to a direction in which the setting item is displayed.

When the setting item is selected, the control section 150 causes the image display section 20 to display, in the left display region 361, an operation item associated with the selected setting item. For example, when current adjustment is selected as a setting item, the control section 150 causes the image display section 20 to display current increase and current reduction in the left display region 361 as operation items.

When the operation item is displayed in the left display region 361, the user operates the operation item with operation of the left hand or operation of the head. The operation of the left hand may be operation for superimposing the left hand on a position where the operation item to be selected is displayed or may be a gesture or a hand sign. The operation of the head is, for example, operation for turning the head to a direction in which the operation item is displayed.

When the operation item is selected, the control section 150 transmits control information including at least one of first operation information corresponding to the selected operation item and second operation information corresponding to the operation of the right hand to the control device via the communication section 117. The first operation information includes, for example, information for instructing current increase and current reduction and information for instructing power-on and power-off of the electric knife.

The control information transmitted to the control device may be information including the first operation information and the second operation information. The second operation information includes, for example, identification information for identifying the electric knife held by the user.

When the user is left-handed and holds the electric knife in the left hand, control information including the second operation information is transmitted from the HMD 100 to the control device. The second operation information in this case is also information for instructing current increase and current reduction or information for instructing power-on and power-off of the electric knife.

The first operation information is equivalent to the "first information" in the aspect of the invention. The second operation information is equivalent to the "second information" in the aspect of the invention.

As explained above, the HMD 100 in the first embodiment includes the image display section 20, the camera 61 and the imaging control section 147 functioning as the detecting section, and the display control section 153.

The image display section 20 displays an image in the display region 310 to be transmitted through an outside scene and visually recognizable together with the outside scene. The camera 61 and the imaging control section 147 detect, in a region including at least a range where the image is transmitted through the image display section 20, fingers of the user functioning as a pointer associated with a motion of the user.

The display control section 153 causes the image display section 20 to display, in the display region 310, an image indicating a detection state in which the detecting section detects the fingers of the user and causes the image display section 20 to display a candidate of input content corresponding to at least any one of a movement, a shape, and a position of the fingers detected by the detecting section. The image indicating the detection state includes the detection range image 320, the candidate display region 330, the candidate character 335 displayed in the candidate display region 330, and the left display region 361 and the right display region 362.

Since the image indicating the detection state of the pointer by the detecting section is displayed in the display region, the HMD 100 in the first embodiment can easily confirm the detection state of the fingers by the detecting section. Since the candidate of input content corresponding to any one of the movement, the shape, and the position of the fingers detected by the detecting section is displayed in a position corresponding to an image indicating the detection area, it is possible to improve input accuracy by the fingers and improve convenience of the user.

The display control section 153 causes the image display section 20 to display the image indicating the detection state of the detecting section in association with a position where the fingers are visually recognized in the outside scene.

Therefore, since the image indicating the detection state of the detecting section is displayed in association with a position where the fingers are visually recognized, the user can confirm the detection state of the detecting section while moving the fingers and inputting operation.

The display control section 153 causes the image display section 20 to display, in a position corresponding to the image indicating the detection state of the detecting section, the candidate of input content corresponding to at least any one of the movement, the shape, and the position of the fingers detected by the detecting section.

Therefore, the user can confirm the detection state by the detecting section while operating the pointer.

The display control section 153 causes the image display section 20 to display the detection range image 320 indicating a detection range in the display region 310 as the image indicating the detection state of the detecting section. The display control section 153 causes the image display section 20 to display, in a position corresponding to the detection range image 320 in the display region 310, the candidate of input content corresponding to at least any one of the movement, the shape, and the position of the fingers detected by the detecting section.

Therefore, since the detection range image 320 indicating the detection area where the detecting section detects the fingers is displayed as the image indicating the detection state of the detecting section, it is easy to confirm the detection area where the fingers are detected. It is possible to improve operability. Since the candidate of input content corresponding to at least any one of the movement, the shape, and the position of the pointer detected by the detecting section is displayed in the position corresponding to the detection range image 320, the user can confirm the detection state of the detecting section while operating the pointer.

The display control section 153 causes the image display section 20 to display the candidate character 335 in the candidate display region 330 and causes the image display section 20 to display the candidate display region 330 in the position corresponding to the detection range image 320 or the position corresponding to the fingers detected in the detection range image 320.

Therefore, it is possible to easily perform operation for selecting a candidate out of the candidate characters 335 displayed in the position corresponding to the detection range image 320 or the position corresponding to the fingers detected in the detection range image 320.

When the detecting section detects fingers in the position corresponding to the candidate display region 330, the display control section 153 selects, on the basis of at least one of a movement, a shape, and a position of the detected fingers, at least anyone of a plurality of candidates displayed in the candidate display region 330.

Therefore, since any one of the plurality of candidate characters 335 can be selected according to at least any one of the movement, the shape, and the position of the fingers, it is possible to simplify operation.

When fingers are detected in a position corresponding to the candidate character 335 displayed in the display region 310, the display control section 153 selects, on the basis of at least any one of a movement, a shape, and a position of the detected fingers, any one of a plurality of candidate characters displayed in the candidate display region 330.

Therefore, it is possible to select any one of the plurality of candidate characters on the basis of a movement, a shape, and a position of the fingers moved to the position corresponding to the candidate character 335.

The display control section 153 causes the image display section 20 to display a plurality of candidates and, when a moving direction of the fingers detected by the detecting section corresponds to any one of directions in which the candidates are displayed, selects a candidate corresponding to the direction.

Therefore, by moving the fingers in a direction in which a candidate that the user desires to select is displayed, the user can select the candidate that the user desires to select.

When a shape of the fingers detected by the detecting section is the same shape for a preset time or more, the display control section 153 causes the image display section 20 to display the candidate.

Therefore, by keeping the shape of the fingers as the same shape for the preset time or more, it is possible to cause the image display section 20 to display the candidate. Therefore, it is possible to display the candidate with simple operation.

The display control section 153 displays the candidate when the position of the fingers detected by the detecting section overlaps a preset position.

Therefore, it is possible to cause the image display section 20 to display the candidate with simple operation.

The display control section 153 displays the candidate when the shape of the pointer detected by the detecting section is a shape corresponding to a preset condition.

Therefore, it is possible to display the candidate with simple operation.

The display control section 153 causes the image display section 20 to display, as the image indicating the detection area, the left detection range image 321 and the right detection range image 322, which are images indicating the detection area including the left hand of the user.

Therefore, it is unnecessary to determine whether fingers detected by the detecting section are the fingers of the left hand or the fingers of the right hand. It is possible to increase a probability that a candidate intended by the user is displayed.

The detecting section detects the left hand and the right hand of the user as pointers. The display control section 153 causes the image display section 20 to display, in the display region, the left display region 361 where an operation item set as a target of operation of the left hand detected by the detecting section is displayed and the right display region 362 where an operation item set as a target of operation of the right hand is displayed.

Therefore, it is possible to perform, with the left hand, operation on the operation item displayed in the left display region 361 and perform, with the right hand, operation on the operation item displayed in the right display region 362.

The HMD 100 transmits control information to the external device according to at least any one of a movement, a shape, and a position of fingers detected by the camera 61 functioning as the detecting section.

Therefore, it is possible to operate the external device according to at least any one of the movement, the shape, and the position of the fingers.

The HMD 100 includes the communication section 117 that outputs control information to the external device according to at least any one of a movement, a shape, and a position of fingers detected by the detecting section. The display control section 153 transmits control information including at least one of first operation information corresponding to operation of the left hand detected by the detecting section and second operation information corresponding to operation of the right hand detected by the detecting section to the external device with the communication section 117.

Therefore, it is possible to operate the external device with the operation of the left hand and the operation of the right hand.

The HMD 100 includes the microphone 63 functioning as a sound input section that inputs sound. When the microphone 63 inputs preset sound, the detection control section 151 detects fingers.

Therefore, it is possible to cause, with a sound input, the HMD 100 to start detection of fingers.

The HMD 100 includes the detection control section 151 that detects operation.

When preset operation is detected, the detection control section 151 shifts to a state in which the detection control section 151 detects fingers.

Therefore, by performing the preset operation, it is possible to cause the detection control section 151 to shift to the state in which the detection control section 151 detects fingers.

The storing section 122 stores the gesture registration dictionary 1251 in which a gesture indicating a track of a preset movement of fingers of the user and a candidate are associated with each other. The storing section 122 stores the hand sign registration dictionary 1252 in which a hand sign indicating a preset shape of fingers and a candidate are associated with each other.

The display control section 153 selects a gesture or a hand sign according to matching of a movement or a shape of fingers detected by the detecting section and the gesture registration dictionary 1251 or the hand sign registration dictionary 1252. The display control section 153 causes the image display section 20 to display a candidate corresponding to the selected gesture or hand sign in the display region 310.

Therefore, it is possible to specify a gesture or a hand sign on the basis of a movement or a shape of fingers of the user and cause the image display section 20 to display a candidate corresponding to the specified gesture or hand sign.

Second Embodiment

Figure 16:
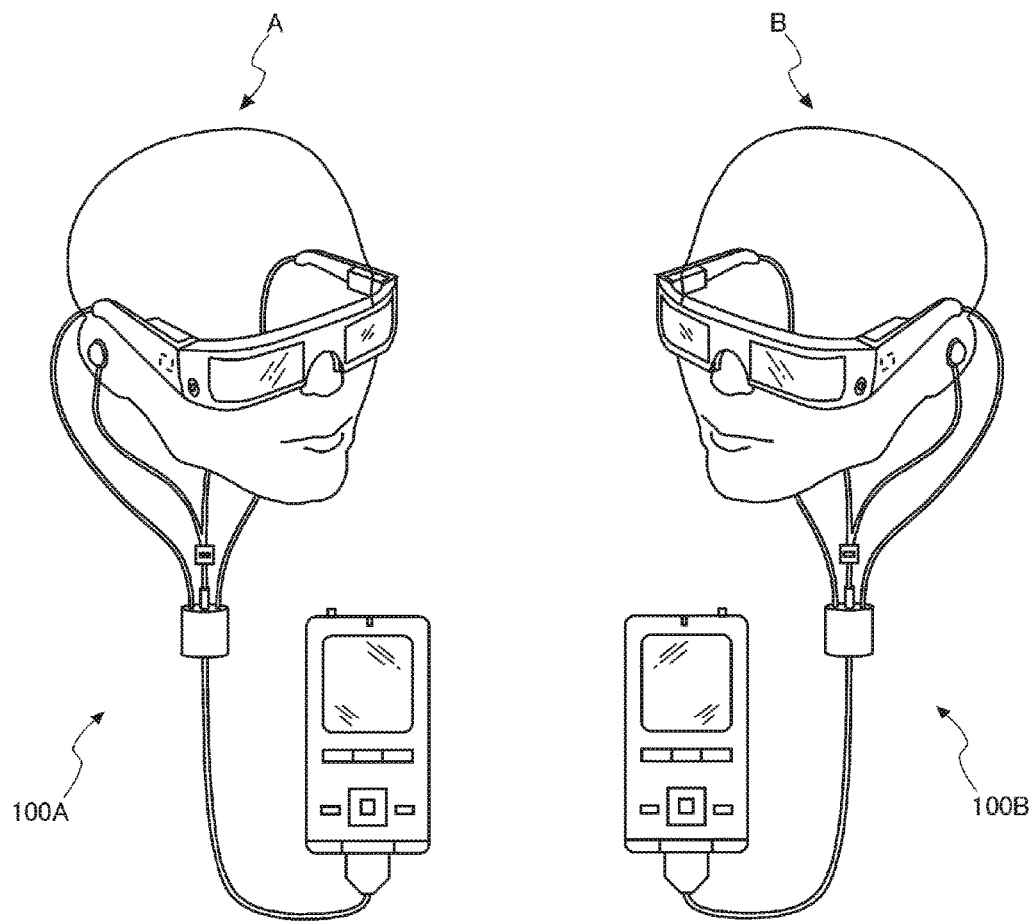
FIG. 16 is a diagram showing a state of use of an HMD in a second embodiment.

FIG. 16 is a diagram showing a state of use of the HMD 100 in a second embodiment.

FIG. 16 shows a scene in which a plurality of users wearing HMDs 100 make conversation using text data. In particular, FIG. 16 shows a scene in which a user A and a user B make conversation. In the following explanation, the HMD 100 worn by the user A is referred to as "HMD 100A" and the HMD 100 worn by the user B is referred to as "HMD 100B". In the following explanation, a sign "A" is added to functional sections (see FIG. 4) configuring the HMD 100A and a sign "B" is added to functional sections (see FIG. 4) configuring the HMD 100B.

The user A and the user B make conversation in a state in which the user A and the user B face each other.

In the state in which the user A and the user B face each other, a camera 61A of the HMD 100A images a gesture and a hand sign performed by the user B besides a gesture and a hand sign performed by the user A. Similarly, a camera 61B of the HMD 100B images a gesture and a hand sign performed by the user A besides a gesture and a hand sign performed by the user B.

It is assumed that a direction of a gesture or a hand sign of the user A imaged by the camera 61A is the front. Since the user A and the user B face each other, in picked-up image data, an image of a gesture or a hand sign of the user B imaged from the rear side, which is a direction different from the front (the opposite direction), is imaged.

A control section 150A of the HMD 100A detects a gesture or a hand sign of the user A and a gesture or a hand sign of the user B from the picked-up image data of the camera 61A. A control section 150B of the HMD 100B detects a gesture or a hand sign of the user A and a gesture or a hand sign of the user B from picked-up image data of the camera 61B.

The user A and the user B perform hand signs or gestures such that images of fingers of the user A and fingers of the user B are not imaged to overlap by the cameras 61A and 61B. For example, the user A and the user B may be prevented from simultaneously performing hand signs or gestures. An arrangement may be made such that the user A performs a gesture or a hand sign on the left side when viewed from the user A and the user B performs a hand sign or a gesture on the left side when viewed from the user B.

Figure 17:
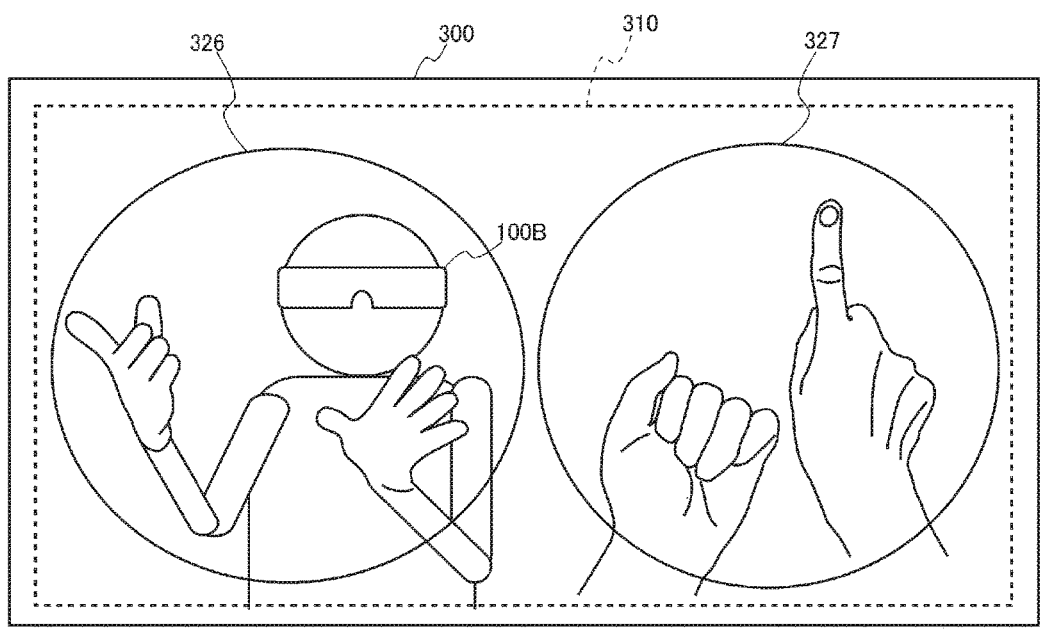
FIG. 17 is a diagram showing a first detection range image and a second detection range image displayed in a display region.

FIG. 17 is a diagram showing a first detection range image 326 and a second detection range image 327 displayed in the display region 310.

The user A adjusts the direction of the head to fit the user B in an angle of view of the camera 61A and operates the operation section 110 to cause the camera 61A to image the user B. At this point, the user A adjusts the direction of the head such that the user B deviates from the center of picked-up image data and is imaged on the right side or the left side of the picked-up image data.

The control section 150A of the HMD 100A specifies, from the picked-up image data of the camera 61A, a person region where a person is imaged and sets a range including the specified person region as a detection range of a hand sign or a gesture performed by the user B, who is a conversation partner of the user A. The control section 150A causes an image display section 20A to display an image indicating the set detection range (hereinafter referred to as first detection range image 326) in the display region 310. The control section 150A sets, in a region other than the first detection range image 326, a detection range in which a gesture or a hand sign of the user A is detected. The control section 150A causes the image display section 20A to display an image indicating the set detection range (hereinafter referred to as second detection range image) 327 in the display region 310. The first detection range image 326 is equivalent to the first detection area in the aspect of the invention. The second detection range image 327 is equivalent to the second detection area in the aspect of the invention.

Figure 18:
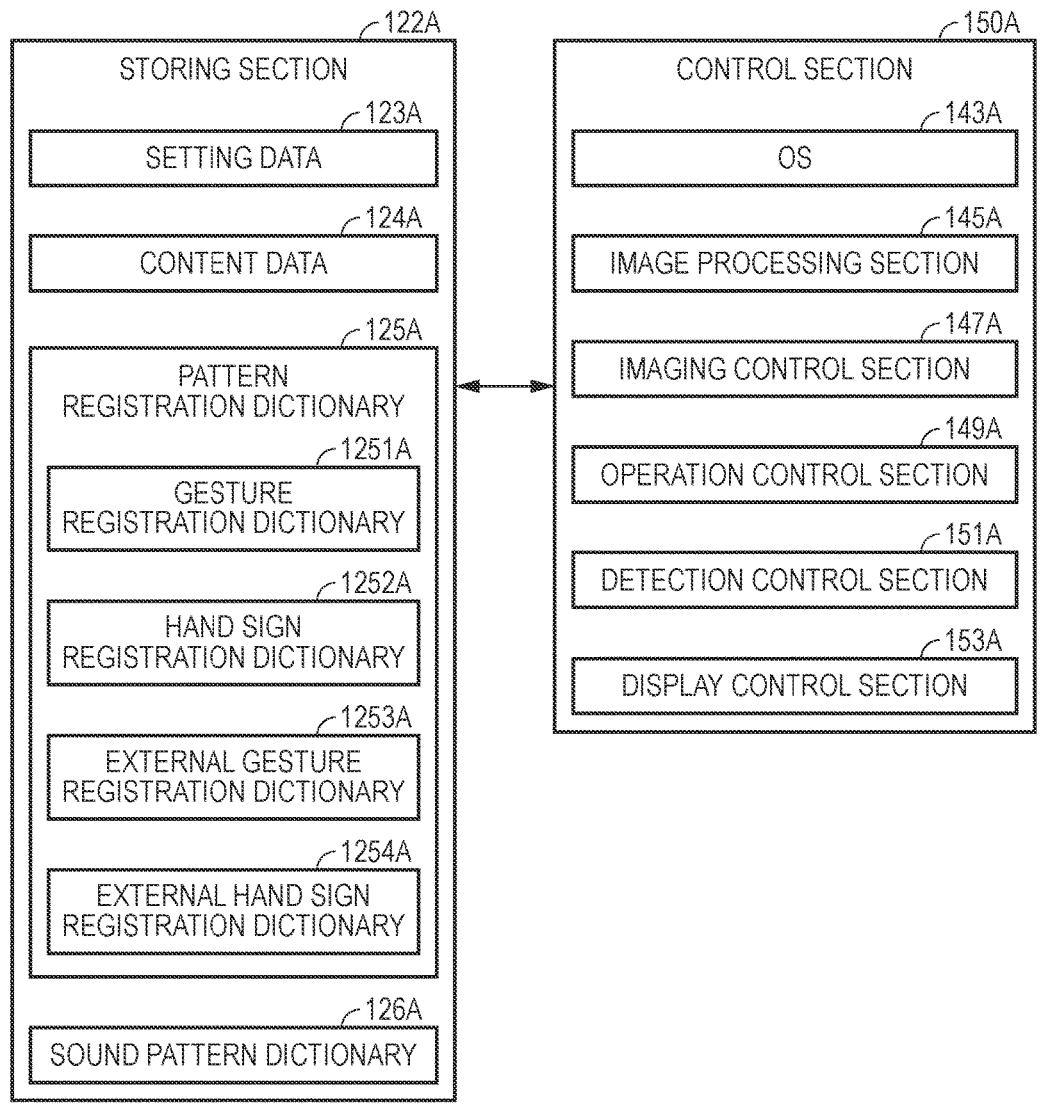
FIG. 18 is a diagram showing the configurations of a control section and a storing section in the second embodiment.

FIG. 18 is a diagram showing the configurations of the control section 150A and a storing section 122A in the second embodiment.

The storing section 122A of the HMD 100A stores, as a pattern registration dictionary 125A, an external gesture registration dictionary 1253A and an external hand sign registration dictionary 1254A besides a gesture registration dictionary 1251A and a hand sign registration dictionary 1252A. The external gesture registration dictionary 1253A and the external hand sign registration dictionary 1254A are equivalent to the "external dictionary information" in the aspect of the invention.

The external gesture registration dictionary 1253A is a dictionary in which information for specifying a gesture performed by a user (the user B) facing the user A and the candidate character 335 associated with the gesture are registered in association with each other. The external hand sign registration dictionary 1254A is a dictionary in which information for specifying a hand sign performed by the user (the user B) and the candidate character 335 associated with the hand sign are registered in association with each other. That is, the gesture registration dictionary 1251A and the hand sign registration dictionary 1252A are dictionaries for specifying a gesture and a hand sign imaged from the front side. The external gesture registration dictionary 1253A and the external hand sign registration dictionary 1254A are dictionaries for specifying a gesture and a hand sign imaged from the rear side in the opposite direction of the front.

The control section 150A images a gesture or a hand sign performed by the user B with the camera 61A. The control section 150A detects, from picked-up image data of the camera 61A, a finger region where fingers of the user B are imaged and specifies a shape and a position of the fingers imaged in the detected finger region. The control section 150A refers to the external gesture registration dictionary 1253A and the external hand sign registration dictionary 1254A on the basis of the specified shape and the specified position of the fingers of the user B and specifies the gesture or the hand sign performed by the user B.

A storing section 122B of the HMD 100B stores, as a pattern registration dictionary 125B, an external gesture registration dictionary 1253B and an external hand sign registration dictionary 1254B besides a gesture registration dictionary 1251B and a hand sign registration dictionary 1252B.

The external gesture registration dictionary 1253B is a dictionary in which information for specifying a gesture performed by the user A facing the user B and the candidate character 335 associated with the gesture are registered in association with each other. The external hand sign registration dictionary 1254B is a dictionary in which information for specifying a hand sign performed by the user A facing the user B and the candidate character 335 associated with the hand sign are registered in association with each other.

Before the users start conversation, the HMDs 100 may communicate with each other and perform processing for confirming whether the external gesture registration dictionary 1253 and the external hand sign registration dictionary 1254 are stored in the storing sections 122 of the HMDs 100 of the communication partners.

For example, it is assumed that the HMD 100A stores the external gesture registration dictionary 1253A and the external hand sign registration dictionary 1254A and the HMD 100B does not store the external gesture registration dictionary 1253B and the external hand sign registration dictionary 1254B. In this case, before starting conversation, the HMD 100A performs communication with the HMD 100B and transmits the external gesture registration dictionary 1253A and the external hand sign registration dictionary 1254A to the HMD 100B. The HMD 100B causes the storing section 122B to store the external gesture registration dictionary 1253A and the external hand sign registration dictionary 1254A received from the HMD 100A. The HMD 100B determines a gesture and a hand sign of the user A using the dictionaries received from the HMD 100A.

As explained above, the HMD 100A in the second embodiment includes the storing section 122A that stores the external gesture registration dictionary 1253A and the external hand sign registration dictionary 1254A. The external gesture registration dictionary 1253A and the external hand sign registration dictionary 1254A are dictionaries for specifying a gesture and a hand sign, which are at least any one of a movement, a shape, and a position of fingers of the user B detected from different directions.

In picked-up image data imaged by the camera 61A of the HMD 100A, fingers of the user B are imaged from a direction different from fingers of the user A. The control section 150A specifies, on the basis of the external gesture registration dictionary 1253A and the external hand sign registration dictionary 1254A, a gesture and a hand sign by the fingers of the user B imaged from a direction different from the fingers of the user A. The control section 150A causes the image display section 20 to display, in the display region 310, the candidate character 335 corresponding to the specified gesture and the specified hand sign.

Therefore, the user A and the user B do not need to perform gestures or hand signs from the same direction. It is possible to reduce labor and time in performing gestures or hand signs.

The HMD 100A includes the communication section 117 that communicates with the HMD 100B, which is an external head-mounted display device. The HMD 100A transmits the external gesture registration dictionary 1253A and the external hand sign registration dictionary 1254A to the HMD 100B with the communication section 117. Therefore, the HMD 100B can detect at least any one of a movement, a shape, and a position of fingers and display a candidate corresponding to a detection result.

The control section 150A detects the user B imaged in the picked-up image data of the camera 61A, and causes, on the basis of a detection result, the image display section 20A to display the first detection range image 326 for detecting a gesture or a hand sign performed by the user A and the second detection range image 327 for detecting a gesture or a hand sign performed by the user B. Therefore, the control section 150A does not need to determine whether detected fingers are fingers of the user A or fingers of the user B. For this reason, it is possible to reduce a time required for recognition processing of fingers and reduce a probability that a gesture or a hand sign by fingers is misrecognized.

In the first detection range image 326, the control section 150A specifies candidates corresponding to a gesture and a hand sign imaged in the picked-up image data using the gesture registration dictionary 1251A and the hand sign registration dictionary 1252A. In the second detection range image 327, the control section 150A specifies candidates corresponding to a gesture and a hand sign imaged in the picked-up image data using the external gesture registration dictionary 1253A and the external hand sign registration dictionary 1254A. Therefore, it is possible to accurately specify a gesture and a hand sign using the dictionaries corresponding to an imaging direction in which the gesture and the hand sign are imaged.

Third Embodiment

In a third embodiment, as in the second embodiment, a scene is assumed in which the HMDs 100 are worn on a plurality of users and the users make conversation using texts. In this embodiment, a gesture or a hand sign performed by the user A is detected by the HMD 100A and a gesture or a hand sign performed by the user B is detected by the HMD 100B.

The control section 150A of the HMD 100A images a gesture or a hand sign performed by the user A with the camera 61A and specifies a text corresponding to the gesture or the hand sign input from picked-up image data. Similarly, the control section 150B of the HMD 100B images a gesture or a hand sign performed by the user B with the camera 61B and specifies a text corresponding to the gesture or the hand sign input from picked-up image data. In this embodiment, the user A and the user B do not need to face each other.

A communication section 117A of the HMD 100A worn by the user A and a communication section 117B of the HMD 100B worn by the user B are connected by wireless communication such as a Bluetooth or a wireless LAN. When the control section 150A detects a gesture or a hand sign performed by the user A and specifies a text corresponding to the detected gesture or hand sign, the control section 150A transmits data of the specified text (text data) to the HMD 100B with the communication section 117A. When receiving the text data from the HMD 100A, the HMD 100B causes an image display section 20B to display the received text data in a display region 310B.

Similarly, when the control section 150B detects a gesture or a hand sign performed by the user B and specifies a text corresponding to the detected gesture or hand sign, the control section 150B transmits data of the specified text (text data) to the HMD 100A with the communication section 117B. When receiving the text data from the HMD 100B, the HMD 100A causes the image display section 20A to display the received text data in a display region 310A.

Figure 19:
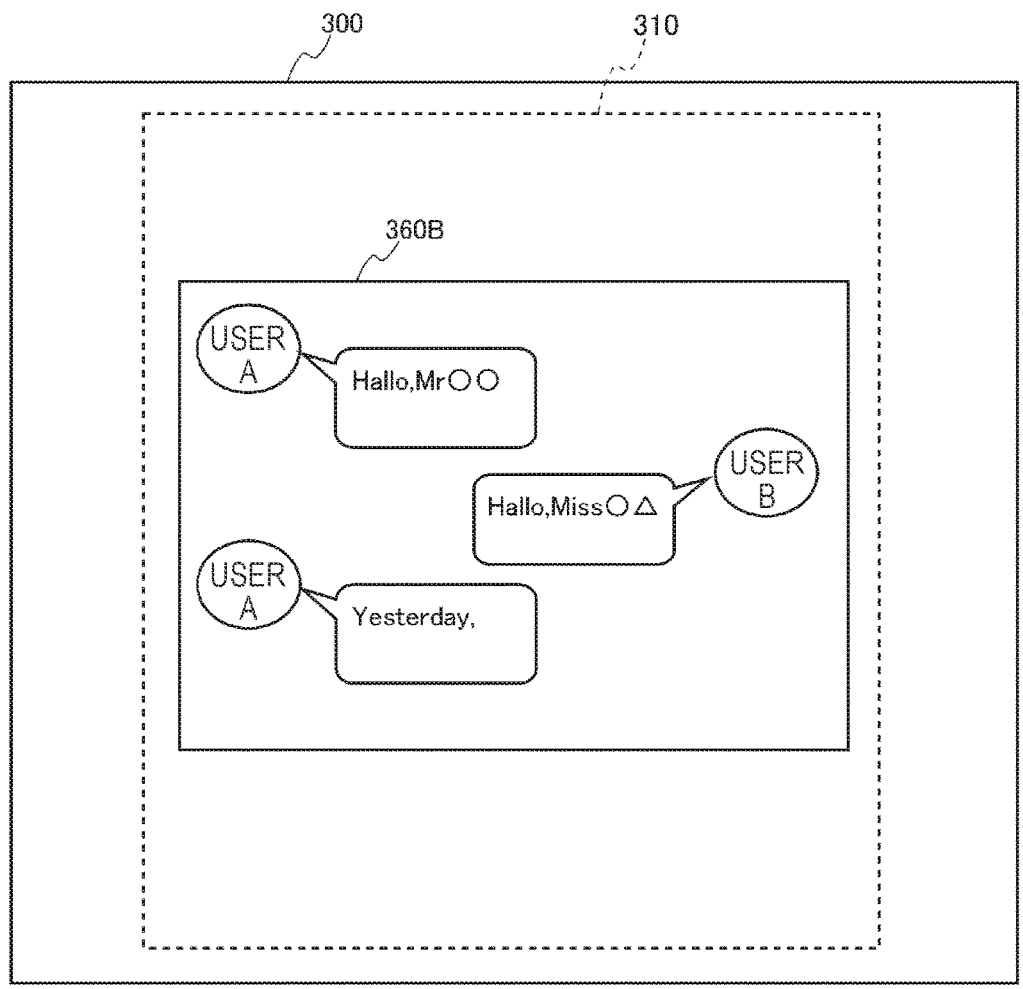
FIG. 19 is a diagram showing a display screen displayed in the display region.

FIG. 19 is a diagram showing a display screen 360B displayed in the display region 310B of the HMD 100B. In particular, FIG. 19 is a diagram showing the display screen 360B on which contents of conversation made by the user A and the user B are displayed to be arranged in time series. For example, on the left side of the display screen 360B, texts indicating utterance contents of the user A are displayed to be arranged in time series from the top to the bottom. On the right side of the display screen 360B, texts indicating utterance contents of the user B are displayed to be arranged in time series from the top to the bottom.

Note that a similar display screen 360A is displayed in the display region 310A of the HMD 100A.

Information input by the user includes information that may be disclosed to the other users and information undesirable to be disclosed to be other users such as a memorandum.

The control section 150A determines on the basis of the distance between the body (the trunk) and the hand of the user A whether an input text should be information disclosed to the other users or information not disclosed to the other users.

For example, the control section 150A compares the size of a hand or a finger imaged in picked-up image data of the camera 61A and a preset threshold and determines whether the input text is disclosed or not. When the size of the imaged hand or finger is equal to or smaller than the preset threshold, the control section 150A determines that a gesture or a hand sign is performed in a position away from the body (the trunk) of the user A. In this case, the control section 150A transmits text data of the input text to the HMD 100B of the conversation partner. The control section 150B of the HMD 100B causes the image display section 20B to display the text data received from the HMD 100A in the display region 310B.

When the size of the imaged hand or finger is larger than the preset threshold, the control section 150A determines that a gesture or a hand sign is performed in a position close to the body (the trunk) of the user A. In this case, the control section 150A does not transmit the text data of the input text to the HMD 100B of the conversation partner and causes the image display section 20A to display the text data in the display region 310A to enable only the user A to visually recognize the text data.

The threshold used for the comparison with the size of the hand or the finger imaged in the picked-up image data of the camera 61 may be set by calibration performed beforehand. For example, the control section 150A causes the image display section 20A to display, in the display region 310A, a message "please perform a gesture or a hand sign at the time when a text to be disclosed is input". Thereafter, the control section 150A performs imaging with the camera 61A, detects a finger region from picked-up image data, and detects a preset size of a hand or a finger (e.g., a thumb). The control section 150A causes the image display section 20A to display, in the display region 310A, a message "please perform a gesture or a hand sign at the time when a text not to be disclosed is input". Thereafter, the control section 150A performs imaging with the camera 61A, detects a finger region from picked-up image data, and detects a preset size of a hand or a finger (e.g., a thumb). The control section 150A sets the threshold to an optimum value on the basis of the size of the hand or the finger imaged by the camera 61 when the text is disclosed and the size of the hand or the finger imaged by the camera 61 when the text is not disclosed.

The embodiments explained above are preferred embodiments of the invention. However, the invention is not limited to the embodiments. Various modified implementation of the invention are possible within a scope not departing from the spirit of the invention.

For example, in the embodiments, fingers of the user are detected using the picked-up image data of the camera 61. However, a method of detecting fingers of the user is not limited to this method. For example, it is also possible that a camera that images an infrared ray is mounted on the HMD 100, an infrared ray output from a device attached to a hand of the user is imaged by the camera, and a movement, a shape, a position, and the like of fingers of the user are detected.

It is also possible that a sensor is attached to a finger of the user, a movement, a shape, a position, and the like of fingers of the user are detected by the sensor, and the movement, the shape, the position, and the like of the fingers detected by the sensor are transmitted to the HMD 100 by short-range wireless communication.

It is also possible that an inertial sensor such as a gyro sensor or an acceleration sensor is attached to fingers of the user and a movement, a shape, a position, and the like of the fingers are inversely calculated from information measured as a movement by the inertial sensor.

In the embodiments explained above, the hand or the finger of the user appearing in the picked-up image data of the camera 61 is detected. However, fingers including an arm of the user may be detected. For example, the user represents a character or a sign input to the HMD 100 with a hand flag signal. The control section 150 of the HMD 100 detects a region where fingers including an arm appear from picked-up image data of the camera 61 and specifies a position of the arm appearing in the detected region. The control section 150 detects a region where fingers including an arm appear from continuously picked-up image data and specifies a position of the arm appearing in the region to detect a movement of the arm, specify a hand flag signal corresponding to the movement, and cause the image display section 20 to display the candidate character 335 in the candidate display region 330.

In the above explanation, the HMD 100 starts the detection of a gesture or a hand sign while being triggered by the operation of the button 11, the up/down key 15, or the track pad 14, the preset movement of the head, or the input of the preset sound. As a trigger other than these triggers, when the HMD 100 is mounted on the head of the user, the HMD 100 may start the detection of a gesture or a hand sign.

For example, a mounting detecting section (not shown in the figure) is provided in the image display section 20 of the HMD 100. The mounting detecting section may detect, for example, on the basis of a detection value of the six-axis sensor 235 or the magnetic sensor 237 provided in the image display section 20 that the HMD 100 is mounted on the head of the user. It is also possible that a hard switch is provided in the image display section 20 of the HMD 100 and the mounting detecting section detects that the HMD 100 is mounted on the head of the user and a state of the hard switch is changed and detects that the HMD 100 is mounted on the head of the user.

In the embodiments explained above, the finger region is detected from the picked-up image data of the camera 61 to specify the region of the candidate display region 330. As operation other than the above, the control section 150 detects a finger region, specifies a region of the candidate display region 330 corresponding to the finger region, and thereafter flashes the candidate character 335 displayed in the specified region. When detecting a movement of the head of the user, for example, a nodding motion, the control section 150 may determine that the candidate character 335 is selected. When detecting a movement of the user swinging the head to the left and the right, the control section 150 desirably acquires picked-up image data of the camera 61 and detects a finger region again.

In the embodiments explained above, the configuration is illustrated in which the control device 10 is connected to the image display section 20 by wire. However, the invention is not limited to this. The image display section 20 may be connected to the control device 10 by radio. As a wireless communication system in this case, the system illustrated as the communication system, to which the communication section 117 is adapted, may be adopted. Other communication systems may be adopted.

A part of the functions included in the control device 10 may be provided in the image display section 20. The control device 10 may be realized by a plurality of devices. That is, the control device 10 is not limited to the configuration including the box-shaped case 10A. For example, a wearable device attachable to the body of the user, clothes, or an ornament worn by the user may be used instead of the control device 10. The wearable device in this case may be, for example, a watch-type device, a finger ring-type device, a laser pointer, a mouse, an air mouse, a game controller, or a pen-type device.

Further, in the embodiments explained above, the configuration in which the image display section 20 and the control device 10 are separated and connected via the connection cable 40 is explained as the example. The invention is not limited to this. A configuration is also possible in which the control device 10 and the image display section 20 are integrally configured and worn on the head of the user.

As the control device 10, a notebook computer, a tablet computer, or a desktop computer may be used. As the control device 10, portable electronic devices including a game machine, a cellular phone, a smart phone, and a portable media player, other dedicated devices, and the like may be used.

For example, an image display section of another system such as an image display section worn like a cap may be adopted instead of the image display section 20. The image display section only has to include a display section that displays an image corresponding to the left eye LE of the user and a display section that displays an image corresponding to the right eye RE of the user. The display device in the embodiments may be configured as a head mounted display mounted on vehicles such as an automobile and an airplane. The display device may be configured as a head mounted display incorporated in a body protector such as a helmet. In this case, a portion for positioning a position with respect to the body of the user and a portion positioned with respect to the portion can be formed as the mounting section.

As the optical system for guiding the image light to the eyes of the user, the configuration is illustrated in which a virtual image is formed in a part of the right light guide plate 26 and the left light guide plate 28 by the half mirrors 261 and 281. The invention is not limited to this. An image may be displayed in a display region having an area occupying the entire or most of the right light guide plate 26 and the left light guide plate 28. In this case, processing for reducing an image may be included in operation for changing a display position of an image.

Further, the optical elements in the embodiments are not limited to the right light guide plate 26 and the left light guide plate 28 including the half mirrors 261 and 281 and only have to be optical components that make image light incident on the eyes of the user. Specifically, a diffraction grating, a prism, or a holography display section may be used.

At least a part of the functional blocks shown in FIGS. 4 and 5 and the like may be realized by hardware or may be realized by cooperation of hardware and software and is not limited to the configuration in which the independent hardware resources are disposed as shown in the figure. The computer program executed by the control section 150 may be stored in the nonvolatile storing section 121 or another storage device (not shown in the figure) in the control device 10. The computer program stored in an external device may be acquired via the communication section 117 or the external connector 184 and executed. Among the components formed in the control device 10, the operation section 110 may be formed as a user interface (UI).

Figure 10:
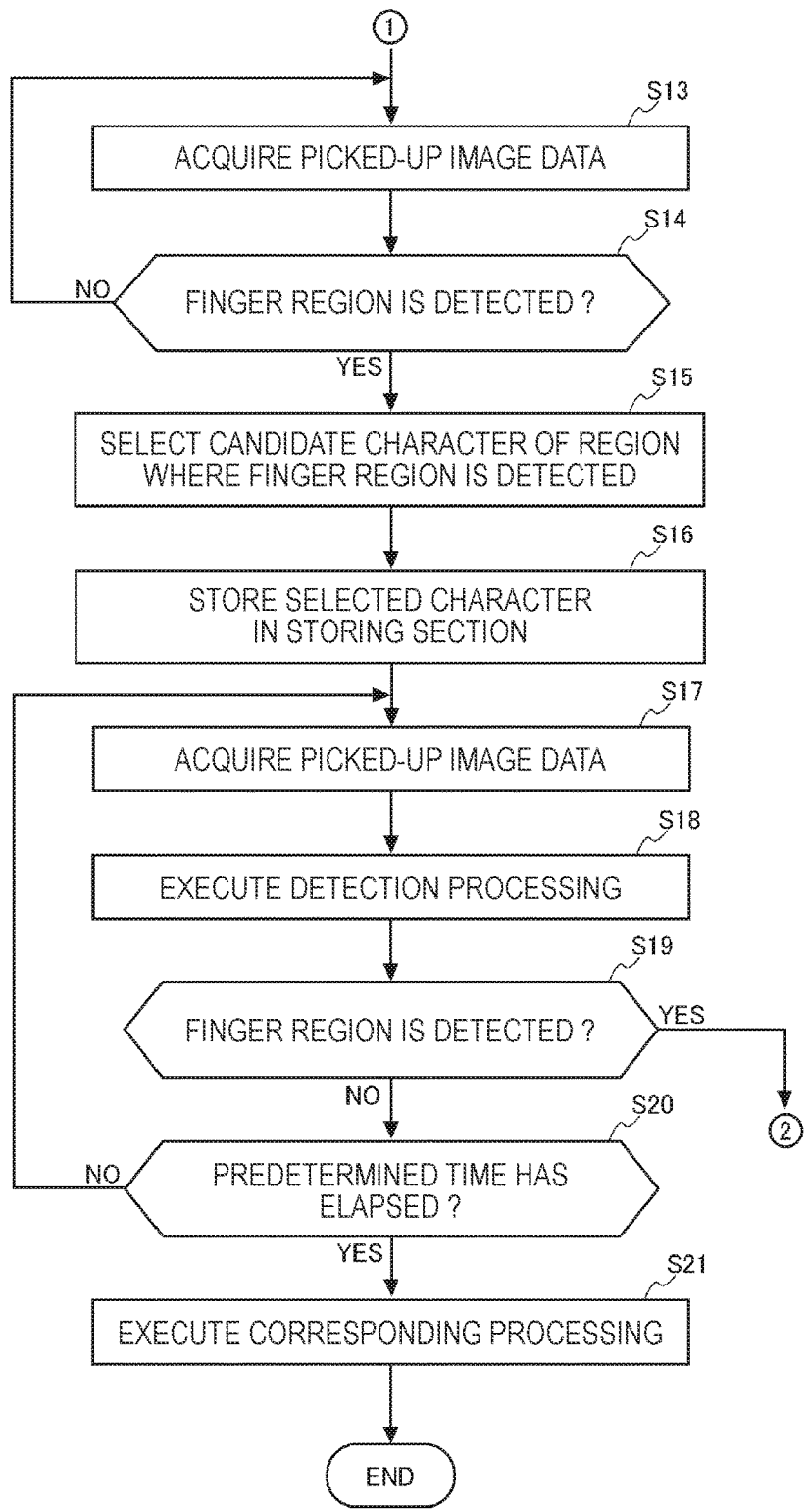
FIG. 10 is a flowchart for explaining the operation of the control section.

The processing units of the flowcharts of FIGS. 6 and 10 are divided according to the main processing contents in order to facilitate understanding of the processing of the control section 150 of the HMD 100. The invention is not limited by a method of division and names of the processing units. The processing of the control section 150 can be divided into a larger number of processing units according to processing contents or can be divided such that one processing unit includes a larger number of kinds of processing. The processing order of the flowchart is not limited to the illustrated example.

When causing the image display section 20A to display the detection range image 320 in the display region 310, the control section 150A desirably adjusts transmittance and a display position of a display image to prevent the display image from hindering visibility of a gesture or a hand sign performed by the user. The display image includes, for example, the detection range image 320, the setting items displayed in the left display region 361 and the right display region 362, the ring image 325, the candidate display region 330, the software keyboard 351, and the text input field 352.

The entire disclosure of Japanese Patent Application Nos. 2016-232379, filed Nov. 30, 2016 and 2017-111052, filed Jun. 5, 2017 are expressly incorporated by reference herein.

What is claimed is:

1. A head-mounted display device mounted on a head of a user, the head-mounted display device comprising:
   a display section configured to display an image in a display region to be transmitted through an outside scene and recognizable together with the outside scene; and
   a processor configured to act as:
      a detecting section configured to detect a pointer associated with a motion of the user in a region including at least a range in which the image is transmitted through the display section; and
      a display control section configured to cause the display section to display, in the display region, an image indicating a detection state in which the detecting section detects the pointer and cause the display section to display a candidate of input content corresponding to at least any one of a movement, a shape, and a position of the pointer detected by the detecting section,
   wherein the display control section causes the display section to display the candidate when at least one of the following occurs:
      (a) the shape of the pointer detected by the detecting section keeps a same shape for a preset time or more;
      (b) the position of the pointer detected by the detecting section overlaps a preset position; or
      (c) the pointer detected by the detecting section corresponds to a preset condition where the pointer is matched with a registration dictionary.

2. The head-mounted display device according to claim 1, wherein the display control section causes the display section to display, in the display region, the image indicating the detection state of the detecting section to be associated with a position where the pointer is visually recognized in the outside scene.

3. The head-mounted display device according to claim 2, wherein the display control section causes the display section to display, in a position corresponding to the image indicating the detection state of the detecting section, the candidate corresponding to at least any one of the movement, the shape, and the position of the pointer detected by the detecting section.

4. The head-mounted display device according to claim 1, wherein the display control section causes the display section to display, in the display region, as the image indicating the detection state of the detecting section, an image indicating a detection area where the detecting section detects the pointer and causes the display section to display, in a position corresponding to the image indicating the detection area in the display region, the candidate corresponding to at least any one of the movement, the shape, and the position of the pointer detected by the detecting section.

5. The head-mounted display device according to claim 4, wherein the display control section causes the display section to display the candidate in a candidate display area of the display region and causes the display section to display the candidate display area in a position corresponding to the image indicating the detection area or a position corresponding to the pointer detected in the detection area.

6. The head-mounted display device according to claim 5, wherein, when the detecting section detects the pointer in a position corresponding to the candidate display area, the display control section selects, on the basis of at least any one of a movement, a shape, and a position of the detected pointer, any one of a plurality of the candidates displayed in the candidate display area.

7. The head-mounted display device according to claim 1, wherein, when the detecting section detects the pointer in a position corresponding to a character of the candidate displayed in the display region, the display control section selects, on the basis of at least any one of a movement, a shape, and a position of the detected pointer, any one of characters of a plurality of the candidates displayed in the candidate display area.

8. The head-mounted display device according to claim 1, wherein the display control section causes the display section to display a plurality of the candidates and, when a moving direction of the pointer detected by the detecting section corresponds to any one of directions in which the candidate is displayed, selects the candidate corresponding to the moving direction.

9. The head-mounted display device according to claim 1, wherein, when the shape of the pointer detected by the detecting section keeps the same shape for a preset time or more, the display control section causes the display section to display the candidate.

10. The head-mounted display device according to claim 1, wherein, when the position of the pointer detected by the detecting section overlaps the preset position, the display control section causes the display section to display the candidate.

11. The head-mounted display device according to claim 1, wherein, when the pointer detected by the detecting section corresponds to the preset condition, the display control section causes the display section to display the candidate.

12. The head-mounted display device according to claim 1, wherein the display control section causes the display section to display, as the image indicating the detection area, an image indicating a detection area where a pointer including a left hand of the user is detected and an image indicating a detection area where a pointer including a right hand of the user is detected.

13. The head-mounted display device according to claim 1, wherein
the detecting section detects, as the pointer, a first pointer including a left hand of the user and a second pointer including a right hand of the user, and
the display control section causes the display section to display, in the display region, a first operation image set as a target of operation of the first pointer detected by the detecting section and a second operation image set as a target of operation of the second pointer detected by the detecting section.

14. The head-mounted display device according to claim 1, wherein the processor is further configured to act as a control-information output section configured to output control information to an external device according to at least any one of the movement, the shape, and the position of the pointer detected by the detecting section.

15. The head-mounted display device according to claim 1, wherein the processor is further configured to act as a control-information output section configured to output control information to an external device according to at least any one of the movement, the shape, and the position of the pointer detected by the detecting section, wherein
the detecting section detects, as the pointer, a first pointer including a left hand of the user and a second pointer including a right hand of the user, and
the control-information output section outputs the control information including at least one of first information corresponding to operation of the first pointer detected by the detecting section and second information corresponding to operation of the second pointer detected by the detecting section.

16. The head-mounted display device according to claim 1, wherein the processor is further configured to act as a sound input section configured to input sound, wherein
the detecting section detects the pointer when the sound input section inputs preset sound.

17. The head-mounted display device according to claim 1, wherein the processor is further configured to act as an operation detecting section configured to detect operation, wherein
when preset operation is detected by the operation detecting section, the detecting section shifts to a state in which the detecting section detects the pointer.

18. The head-mounted display device according to claim 1, further comprising a memory configured to store at least either one of a gesture registration dictionary in which a gesture indicating a track of a preset movement of fingers of the user serving as the pointer and the candidate are associated and a hand sign registration dictionary in which a hand sign indicating a preset shape of the fingers and the candidate are associated, wherein
the display control section selects the gesture or the hand sign according to matching of a movement, a shape or a position of the fingers detected by the detecting section and the gesture registration dictionary or the hand sign registration dictionary and causes the display section to display the candidate corresponding to the selected gesture or hand sign.

19. The head-mounted display device according to claim 1, further comprising a memory configured to store external dictionary information for detecting the pointer associated with a motion of another user from a direction different from a detecting direction of the pointer associated with the motion of the user, and displaying a candidate corresponding to at least any one of a movement, a shape, and a position of the pointer associated with the motion of the other user detected from the different direction, wherein
the display control section specifies, on the basis of the external dictionary information, the candidate corresponding to at least any one of the movement, the shape, and the position of the pointer associated with the motion of the other user and causes the display section to display the specified candidate.

20. The head-mounted display device according to claim 19, further comprising a communicator configured to communicate with an external head-mounted display device, wherein
the head-mounted display device transmits the external dictionary information to the external head-mounted display device with the communicator.

21. The head-mounted display device according to claim 19, wherein
the detecting section optically detects the other user, and
the display control section causes, on the basis of a detection result of the detecting section, the display section to display, in the display region, a first detection area where at least any one of a movement, a shape, and a position of the pointer associated with the motion of the other user is optically detected and display, in the display region excluding the first detection area, a second detection area where at least any one of a movement, a shape, and a position of the pointer associated with the motion of the user is optically detected.

22. The head-mounted display device according to claim 21, wherein the display control section specifies, on the basis of the external dictionary information, the candidate corresponding to at least any one of a movement, a shape, and a position of the pointer detected by the detecting section in the first detection area and specifies, on the basis of the dictionary information, the candidate corresponding to at least any one of a movement, a shape, and a position of the pointer detected by the detecting section in the second detection area.

23. A non-transitory, computer readable medium having a computer program stored thereon, the computer program executed by a computer mounted on a head-mounted display including: a display section configured to display an image in a display region to be transmitted through an outside scene and recognizable together with the outside scene; and a processor configured to act as detecting section configured to detect a pointer associated with a motion of the user in a region including at least a range in which the image is transmitted through the display section, the head-mounted display device being mounted on a head of the user,
the computer program causing the computer to execute:
a procedure for causing the display section to display, in the display region, an image indicating a detection state in which the detecting section detects the pointer; and
a procedure for causing the display section to display a candidate of input content corresponding to at least any one of a movement, a shape, and a position of the pointer detected by the detecting section,
wherein the candidate is displayed when at least one of the following occurs:
(a) the shape of the pointer detected by the detecting section keeps a same shape for a preset time or more;
(b) the position of the pointer detected by the detecting section overlaps a preset position; or
(c) the pointer detected by the detecting section corresponds to a preset condition where the pointer is matched with a registration dictionary.

24. A control method for a head-mounted display including: a display section configured to display an image in a display region to be transmitted through an outside scene and recognizable together with the outside scene; and a detecting section configured to detect a pointer associated with a motion of the user in a region including at least a range in which the image is transmitted through the display section, the head-mounted display device being mounted on a head of the user, the control method comprising:
causing the display section to display, in the display region, an image indicating a detection state in which the detecting section detects the pointer; and
causing the display section to display a candidate of input content corresponding to at least any one of a movement, a shape, and a position of the pointer detected by the detecting section,
wherein the candidate is displayed when at least one of the following occurs:
(a) the shape of the pointer detected by the detecting section keeps a same shape for a preset time or more;
(b) the position of the pointer detected by the detecting section overlaps a preset position; or
(c) the pointer detected by the detecting section corresponds to a preset condition where the pointer is matched with a registration dictionary.

25. A head-mounted display device mounted on a head of a user, the head-mounted display device comprising:
a display section configured to display an image in a display region to be transmitted through an outside scene and recognizable together with the outside scene; and
a processor configured to act as:
a detecting section configured to detect a pointer associated with a motion of the user in a region including at least a range in which the image is transmitted through the display section; and
a display control section configured to cause the display section to display, in the display region, an image indicating a detection state in which the detecting section detects the pointer and cause the display section to display a candidate of input content corresponding to at least any one of a movement, a shape, and a position of the pointer detected by the detecting section,
wherein the display control section causes the display section to display, as the image indicating the detection area, an image indicating a detection area where a pointer including a left hand of the user is detected and an image indicating a detection area where a pointer including a right hand of the user is detected.

26. A head-mounted display device mounted on a head of a user, the head-mounted display device comprising:
a display section configured to display an image in a display region to be transmitted through an outside scene and recognizable together with the outside scene; and
a processor configured to act as:
a detecting section configured to detect a pointer associated with a motion of the user in a region including at least a range in which the image is transmitted through the display section; and
a display control section configured to cause the display section to display, in the display region, an image indicating a detection state in which the detecting section detects the pointer and cause the display section to display a candidate of input content corresponding to at least any one of a movement, a shape, and a position of the pointer detected by the detecting section,
wherein
the detecting section detects, as the pointer, a first pointer including a left hand of the user and a second pointer including a right hand of the user, and
the display control section causes the display section to display, in the display region, a first operation image set as a target of operation of the first pointer detected by the detecting section and a second operation image set as a target of operation of the second pointer detected by the detecting section.

27. A head-mounted display device mounted on a head of a user, the head-mounted display device comprising:
a display section configured to display an image in a display region to be transmitted through an outside scene and recognizable together with the outside scene; and
a processor configured to act as:
a detecting section configured to detect a pointer associated with a motion of the user in a region including at least a range in which the image is transmitted through the display section;

a display control section configured to cause the display section to display, in the display region, an image indicating a detection state in which the detecting section detects the pointer and cause the display section to display a candidate of input content corresponding to at least any one of a movement, a shape, and a position of the pointer detected by the detecting section; and a control-information output section configured to output control information to an external device according to at least any one of the movement, the shape, and the position of the pointer detected by the detecting section, wherein the detecting section detects, as the pointer, a first pointer including a left hand of the user and a second pointer including a right hand of the user, and the control-information output section outputs the control information including at least one of first information corresponding to operation of the first pointer detected by the detecting section and second information corresponding to operation of the second pointer detected by the detecting section.

* * * * *